United States Patent
Diesnis

(10) Patent No.: US 10,363,698 B2
(45) Date of Patent: *Jul. 30, 2019

(54) MACHINE FOR FORMING AND FILLING CONTAINERS COMPRISING A FIRST CLOSED LOOP AND A SECOND CLOSED LOOP HAVING A COMMON PART

(71) Applicant: DISCMA AG, Hunenberg (CH)

(72) Inventor: Daniel Diesnis, Octeville sur Mer (FR)

(73) Assignee: DISCMA AG, Zürich (CH)

( * ) Notice: Subject to any disclaimer, the term of this patent is extended or adjusted under 35 U.S.C. 154(b) by 491 days.

This patent is subject to a terminal disclaimer.

(21) Appl. No.: 15/030,478

(22) PCT Filed: Oct. 20, 2014

(86) PCT No.: PCT/EP2014/072459
§ 371 (c)(1),
(2) Date: Apr. 19, 2016

(87) PCT Pub. No.: WO2015/059101
PCT Pub. Date: Apr. 30, 2015

(65) Prior Publication Data
US 2016/0271858 A1  Sep. 22, 2016

(30) Foreign Application Priority Data

Oct. 21, 2013 (EP) ..................................... 13306444

(51) Int. Cl.
*B29C 49/26* (2006.01)
*B29C 49/36* (2006.01)
(Continued)

(52) U.S. Cl.
CPC .............. *B29C 49/46* (2013.01); *B29B 11/08* (2013.01); *B29C 49/06* (2013.01); *B29C 49/12* (2013.01); *B29C 49/36* (2013.01); *B29C 49/4236* (2013.01); *B65B 3/022* (2013.01); *B65B 43/50* (2013.01); *B29B 11/04* (2013.01);
(Continued)

(58) Field of Classification Search
CPC .............. B29C 49/4205; B29C 49/421; B29C 2049/4664; B29C 2049/4655; B29C 49/46; B29C 49/36; B65B 3/022; B65B 43/54

See application file for complete search history.

(56) References Cited

U.S. PATENT DOCUMENTS 10,065,358 B2 * 9/2018 Diesnis .................. B29C 49/46
2014/0174034 A1 6/2014 Drenguis et al.

FOREIGN PATENT DOCUMENTS

DE        2462888 C2   9/1984
JP        2000043129 A  2/2000

* cited by examiner

*Primary Examiner* — Robert B Davis
(74) *Attorney, Agent, or Firm* — Eric J. Sosenko; Jonathan P. O'Brien; Honigman LLP

(57) ABSTRACT

A machine for shaping from a preform and filling with liquid successive containers. The machine includes forming stations comprising a main station and an elementary station. The machine further includes a series of elementary stations moving along a first closed loop and a series of main stations moving along a second closed loop. The first closed loop and the second closed loop including at least one common part wherein the main stations are coupled with the elementary stations and a distinct part wherein the main stations are separated from the elementary stations.

17 Claims, 11 Drawing Sheets

(51) Int. Cl.
*B29C 49/42* (2006.01)
*B29C 49/46* (2006.01)
*B65B 3/02* (2006.01)
*B29C 49/06* (2006.01)
*B29C 49/12* (2006.01)
*B29B 11/08* (2006.01)
*B65B 43/50* (2006.01)
*B29B 11/04* (2006.01)
*B29C 49/48* (2006.01)
*B29C 49/58* (2006.01)
*B29L 31/00* (2006.01)

(52) U.S. Cl.
CPC ............... *B29B 2911/14506* (2013.01); *B29C 2049/4664* (2013.01); *B29C 2049/4892* (2013.01); *B29C 2049/5831* (2013.01); *B29C 2049/5834* (2013.01); *B29C 2049/5862* (2013.01); *B29L 2031/712* (2013.01)

ental phase of PCT Application No. PCT/EP2014/072459, filed on Oct. 20, 2014, and claims priority to EP13306444.4 filed on Oct. 21, 2013, the disclosures of which are incorporated in their entirety by reference herein.

MACHINE FOR FORMING AND FILLING CONTAINERS COMPRISING A FIRST CLOSED LOOP AND A SECOND CLOSED LOOP HAVING A COMMON PART

CROSS REFERENCE TO RELATED APPLICATIONS

This application is the U.S. national phase of PCT Application No. PCT/EP2014/072459, filed on Oct. 20, 2014, and claims priority to EP13306444.4 filed on Oct. 21, 2013, the disclosures of which are incorporated in their entirety by reference herein.

TECHNICAL FIELD OF THE INVENTION

The present invention relates to a machine for forming and filling containers in particular by injecting a liquid inside successive preforms placed in successive molds.

The invention also relates to a method for forming and filling containers using such a machine.

The invention relates to the field, known as hydro forming, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like edible oil or soup), or a high viscosity (like yogurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

In such machines and methods, successive preforms are placed in successive molds and the injection is performed at a container forming wheel, or carousel, movable in rotation and carrying the molds. The injection is performed in a forming area of the wheel at a high pressure via injection means coupled to the molds. The forming station is defined as being an active forming station when the injection means are placed in fluidic communication with the inner volume of the preforms. By active, it is meant that the forming station is performing one of the steps of the forming and filling process.

The wheel comprises a loading area where the preforms are loaded in the molds and an exit area where the formed and filled containers are retrieved from the molds, the forming area extending between the loading area and the exit area.

Consequently, the forming wheel has to have a very large diameter to be able to comprise a loading area, a forming area and an exit area, while the forming area is reduced to a relative small part of the periphery of the wheel. This means that only a small number of the forming stations can be active at the same time. Indeed, a part of the periphery of the wheel has to be used to closed the mold and to place the injection means in fluidic communication with the inner volume of the preforms downstream of the loading area and another part of the periphery of the wheel has to be used to retract the injection means and open the mold upstream of the exit area.

Furthermore, at the exit area of a forming wheel, the formed and filled containers are subjected to a centrifugal force while they are opened, which can lead to a deformation or a destruction of the containers.

More particularly, when the formed and filled containers move from the forming wheel to the transfer wheel, the direction of rotation of the containers changes, which implies that the centrifugal forces applied by the forming wheel and the centrifugal forces applied by the transferring wheel are of opposite signs, which generates very important constraints on the formed containers. Such constraints applied by the liquid on the containers while they move at high speed can lead to a deformation or even a destruction of some of the containers, thereby spilling the content of these containers in the machine. There is therefore a high risk of soiling the machine with liquid, which requires stopping the machine to clean it and reduces the throughput of the machine.

Document WO-2012/156014 discloses such a machine for forming and filling containers, wherein the opened and filled containers are separated from injection nozzles while the molds are placed in a retracted position away from the injection nozzles. Such a machine has a reduced forming area as described previously, since a part of the periphery of the wheel has to be used to closed the mold and to place the injection means in fluidic communication with the inner volume of the preforms downstream of the loading area and another part of the periphery of the wheel has to be used to retract the injection means and open the mold upstream of the exit area. The machine is arranges such that, if liquid is spilled out of the containers, said liquid will not soil the molds, which reduces the need to clean the machine. However, such a machine does not prevent the spilling of the content of the containers. Such a machine is therefore not satisfactory since a part of the liquid injected in the containers is lost. Consequently, in order to prevent any spilling, the speed of rotation of the different wheels of the machine is necessarily limited, thereby limiting the throughput of the machine. To avoid excessive reducing of the machine throughput, one can imagine increasing the number of forming station around the forming wheel. A drawback of this solution is the higher cost of the machine.

One of the aims of the invention is to overcome the drawbacks mentioned above, by proposing a machine and a method for forming and filling containers, to allow addressing issues of a particular step of the container manufacturing process without excessively increasing the machine cost. An example of the issue that could be addressed may be the spilling of the liquid contained into the filled container.

SUMMARY OF THE INVENTION

To this end, the invention relates to a machine for forming and filling containers of the type being adapted to shape from a preform and fill with liquid successive containers in forming stations, each forming station comprising a main station and an elementary station which are coupled together to form the forming station, wherein the machine comprises a series of elementary stations moving along a first closed loop and a series of main stations moving along a second closed loop, the first closed loop and the second closed loop comprising at least one common part wherein the main stations are coupled with the elementary stations and at least a distinct part wherein the main stations are separated from the elementary stations.

The elementary stations can be dedicated to some steps of the container manufacturing method. For example, the preforms can be loaded and the filled containers can be retrieved from the elementary stations in the distinct part of the first closed loop. As the first and second loops have a distinct part, it allows the second loop to have fewer main stations than the first loop has elementary stations. Therefore, the machine cost is reduced with respect to a machine having only full forming stations adapted to perform all the steps of the container manufacturing method. For example, the forming area of the second loop can be increased, which means that the number of active forming stations is increased, relative to a machine wherein the forming stations are moved along a unique closed loop.

To this end, according to particular features of the machine according to the invention:
fewer main stations move along the second closed loop than elementary stations move along the first closed loop;
the machine comprises at least a first wheel carrying the series of main stations, the distinct part of the first closed loop extending outside the periphery of said first wheel; and
the second closed loop is defined by the periphery of said first wheel.

According to particular features of the machine according to the invention, each elementary station comprises holding means for holding at least a neck of a preform or of a filled container.

The elementary stations can be used for separating formed and filled containers from the main stations. Such holding means can advantageously prevent the deformation or the destruction of the containers. Thanks to the holding means, the same elementary station can then receive a new preform for the next manufacturing cycle.

According particular features of the machine according to the invention, the holding means comprise at least a neck holding part arranged to hold the container by its neck and at least a bottom holding part arranged to hold the container by its bottom, the neck holding part and the bottom holding part being movable relative to each other between a holding position, wherein a container is held and a release position wherein the bottom holding part and the neck holding part are moved away from each other.

By holding the filled and opened containers by their neck and bottom, the force applied by the liquid on the container does not imply a risk of deforming or destroying the containers even if the containers circulate at a high speed. The throughput of the machine can therefore be increased by increasing the transportation speed of the containers.

According to particular features of the machine according to the invention:
each forming station comprises a molding cavity defining the shape of the container to be formed, each main station comprising at least a main part of said molding cavity;
wherein the forming station comprises a pair of side molding parts, each part of said pair being movable with respect to the other part between an opened configuration,
wherein a preform can be inserted in said pair and a filled container is extractable from said pair, and a closed configuration wherein the pair of side molding parts cooperates with a bottom molding part (36) to form the molding cavity; and
wherein each main station further comprises injection means for injecting a liquid inside a preform placed in the molding cavity;
said elementary station comprises said pair of side molding parts, the holding means being constituted by said pair, and
wherein the main part of the molding cavity included in the main station comprises said bottom molding part.

In a machine having the above features, the pair of side molding parts may hold the filled container by the neck of said container and preferably, but not mandatory, in the vicinity of the bottom of the container. The bottom holding part and bottom cooling means could stay in the main station.

According to another feature of the machine according to the invention, the main part of the molding cavity included in the main station comprises said pair of side molding parts and is arranged to receive said holding means.

In a machine having that feature, the holding means may comprise a neck holding fork, or the like, which can be coupled with the pair of side molding part to form the active, or the completed forming station. In a variant of that machine, the holding means may further comprise a bottom molding part, and preferably but not mandatory, without cooling means of such bottom molding part.

Another variant of the above machine may further be such that the main station further comprises a transition arm arranged to move at least laterally said bottom molding part.

When the elementary station separates from the main station, the bottom molding part may be moved down to leave the formed and filled container going its own way outside the two side molding parts. The downward movement of the bottom molding part is a short transition period during which the transition arm moves laterally with respect to the main station such that, during this transition period, the bottom molding part follows the separated container without interfering mechanically with the container.

According to another feature of the machine according to the invention, the main part of the molding cavity included in the main station comprises a main portion of said pair of side molding parts, the holding means comprising a complementary portion of said pair of side molding parts, the main portion and the complementary portion forming together said pair of side molding parts.

In a machine having that feature, the molding surface of the two side molding parts is split in a main portion which follows the main station and in a complementary portion which follows the elementary station. The complementary portion could be formed of a bottom vicinity holding part which may be included in said holding means and hold the filled container in the vicinity of its bottom.

According to another feature of the machine according to the invention, each elementary station further comprises an anti-spilling device for preventing liquid from overflowing out of a formed container.

A machine having that feature may advantageously comprise the above mentioned holding means. This allows the elementary station to take in charge the filed container by holding it and to avoid spilling of the liquid contained in the container.

According to other features of the machine according to the invention:
the elementary station comprises an anti-spilling actuator arranged to place the anti-spilling device in an anti-spilling configuration and to move the anti-spilling device away from the holding means for retrieving the anti-spilling device from the neck of a preform; and
the anti-spilling device comprises an extension device arranged to be placed on the neck of a preform or a container in a fluid tight manner, said extension device comprising a central bore extending in the continuity of the inner cylindrical opening of said neck.

According to other features of the machine according to the invention, the distinct part of the first closed loop comprises at least one straight portion extending downstream of the common part of the first closed loop and second closed loop, the common part of the first closed loop and second closed loop comprising at least one circular portion, the straight portion of the first closed loop extending immediately downstream of said circular portion and extending according to a direction forming a tangent of the circular portion at a separation junction between the circular portion and the straight portion, the main stations being separated from the elementary stations at said separation junction.

The machine according to the invention is arranged such that the opened formed and filled containers circulate on the straight portion, i.e. along a substantially rectilinear path. Consequently, the machine comprises a stabilization area wherein the liquid inside the containers is not subjected to centrifugal forces and has time to settle inside the containers. The formed and filled containers can therefore be transported to a capping station without risking spilling the content of the containers in the machine.

By making the transition between the circular portion and the straight portion tangential to circular portion, the transition between these portions limits the acceleration imparted on the containers, thereby limiting the constraints applied on the containers and limiting the risks of spilling or of breakage of the containers.

According to other features of the machine according to the invention:
  the machine comprises an exit area extending outside the first closed loop and connected to the first closed loop at an exit junction located downstream of the straight portion, and comprises an exit conveyor provided with exit carriers,
  wherein the exit conveyor extends continuously along a retrieving area located upstream of said exit junction and along said exit area, each exit carrier comprising extraction means arranged to extract the filled container from the holding means while said exit carrier is in said retrieving area; and
  the machine further comprises reducing means located upstream the exit junction and arranged to reduce the pitch between successive elementary stations and/or further comprising reducing means located along said exit area and arranged to reduce the pitch between two successive exit carriers.

By providing pitch reducing means, it is possible to reduce the distance between successive formed and filled containers, said successive formed and filled containers being then moved outside the first closed loop, which reduces the space requirement of the machine outside said first closed loop.

According to another feature of the machine according to the invention, the machine further comprises a capping station arranged to apply a cap on the filled containers, said capping station being arranged outside of the first closed loop and of the second closed loop.

The invention also relates to a method for forming and filling containers using a machine as described above, the method comprising the following steps:
  loading successive preforms to the elementary stations in the distinct part of the first closed loop,
  moving the elementary stations holding preforms to the common part of the first closed loop and of the second closed loop,
  coupling the elementary stations to the main stations to form forming stations,
  performing the steps of forming and filling the containers in the forming stations in the common part of the first closed loop and of the second closed loop,
  decoupling the elementary stations from the main stations and moving the elementary stations to the distinct part of the first closed loop, said elementary stations holding the formed and filled preforms, and
  retrieving the formed and filled containers from the elementary stations in said distinct part of the first closed loop.

As mentioned previously, by loading the preforms and retrieving the formed containers in the distinct part of the first closed loop, it is possible to increase the forming area of the machine. Furthermore, the elementary stations can be used as holding means for holding the filled and formed containers once they are separated from the main stations, such holding means preventing the deformation or the destruction of the containers.

According to other features of the machine and of the method according to the invention:
  the machine defines at least a first closed loop, and comprises a plurality of holding means, each holding means being adapted to hold a neck of a preform or of a formed and filled container, the holding means being distributed along said first closed loop, the machine further comprising conveying means adapted to convey the holding means along said closed loop in a conveying direction, said first closed loop comprising a forming area along which each holing means circulating in said forming area is integrated in a forming station, said forming station comprising a mold, receiving a preform held by said holding means, and injection means adapted to inject a liquid inside the held preform such that the held preform is shaped into a container, wherein the first closed loop comprises at least one straight portion extending substantially rectilinearly;
  the first closed loop comprises at least a separation area, wherein each container formed and filled inside a mold is separated from said mold, said separation area being arranged directly upstream or directly downstream of the straight portion;
  the separation area comprises a separation point, downstream of which the molds and the filled containers circulate along different paths, said separation point being formed by the upstream end or by the downstream the end of the straight portion of the first closed loop;
  said holding means are arranged to hold each container at least in the vicinity of its neck and at least in the vicinity of its bottom, at least when said holding means circulate on the straight portion of the first closed loop;
  the first closed loop comprises a circular portion upstream of the straight portion, said straight portion extending according to a direction forming a tangent of the circular portion at the junction between the circular portion and the straight portion;
  the injection means are distributed along a second closed loop, said second closed loop and the first closed loop comprising at least one common part, said common part defining the forming area;
  the molds are distributed along the entire first closed loop, the molds being coupled to the injection means in the forming area and being separated from said injection means outside said forming area;
  the holding means are constituted by a part of the mold;

the molds are distributed along the second closed loop and
remain coupled to the injection means along said
second closed loop, the preforms being received by the
molds at one end of the forming area and the formed
and filled containers being separated from said molds at
the other end of said forming area;

the first closed loop comprises:
a first circular portion forming at least a part of the
forming area,
a first straight portion extending downstream of the first
circular portion,
a second circular portion extending downstream of the
first straight portion, and
a second straight portion extending between the second
circular portion and the first circular portion,
the machine further comprising an exit conveyor located
in an exit area of the machine and adapted to extract formed
and filled containers from the first closed loop;
the exit conveyor comprises a substantially rectilinear
portion aligned with the straight portion;
and/or wherein the exit area is located at the junction
between the straight portion and the second circular portion
of the first closed loop;
the conveying means are adapted to convey the holding
means with a constant pitch along the first closed loop,
or with a predetermined variation of pitch along the
first closed loop;
and/or wherein the conveying means comprise a plurality
of mechanical links connecting two adjacent holding means
such that the plurality of holding means and the plurality of
mechanical links form a deformable chain extending along
the first closed loop;
and/or wherein the conveying means comprise at least a
fix magnetic path extending along at least a magnetic portion
of the first closed loop, each of the holding means being
carried by an independent carrier adapted to be driven
magnetically along the fix magnetic path.
the first circular portion and the second circular portion
are each formed by part of a wheel, moving in rotation
around an axis which is substantially perpendicular to
a plane containing the first closed loop;
and/or wherein the wheel forming the second circular
portion has a smaller diameter than the wheel forming the
first circular portion, such that at least part of the second
straight portion forms an angle with the first straight portion.

The invention also relates to a method for forming and
filling containers using a machine as described above, said
method comprising the following steps:
feeding successive preforms to successive holding means,
such that each holding means holds a preform by its
neck;
circulating the successive holding means holding the
preforms in the forming area of the machine, the
preforms being placed in successive molds and the
molds being coupled to injection means for injecting a
liquid inside the preforms placed in the molds to shape
said preforms into containers in said forming area such
that formed and filled containers are obtained at the end
of said forming area,
retrieving formed and filled containers at an exit area of
the machine,
wherein the formed and filled containers are circulated on
the straight portion of the first closed loop defined by the
machine before being retrieved from the machine at the exit
area.

The invention also relates to a formed and filled container
obtained by the method and using the machine described
above.

The machine and method described above relate to a
hydro forming process of containers. However, it should be
noted that the invention can be applied to a simple filling
process of already formed containers, by replacing the
forming stations by filling stations, wherein the formed
containers are placed in fluidic communication with the
injection means.

BRIEF DESCRIPTION OF THE DRAWINGS

Other aspects and advantages of the invention will appear
upon reading the following description, given by way of
example and made in reference to the appended drawings,
wherein.

DETAILED DESCRIPTION OF THE
INVENTION

In the present description, the terms "upstream" and
"downstream" are defined relative to the direction of circulation of the preforms and of the formed containers in the
machine according to the invention.

Figure 1:
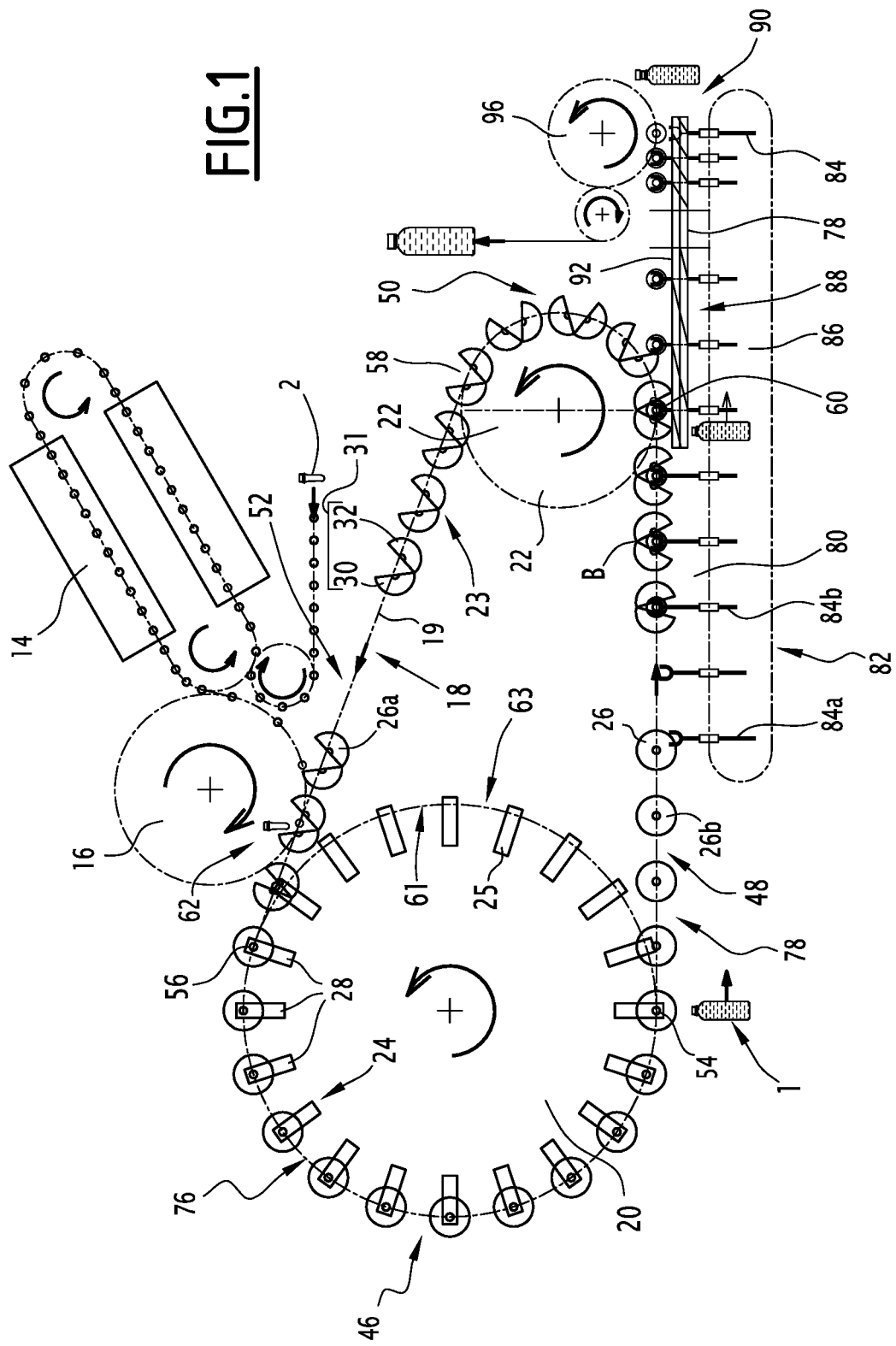
FIG. 1 is a diagrammatical view from above of a machine
for forming containers according to a first embodiment of
the invention.
Figure 2:
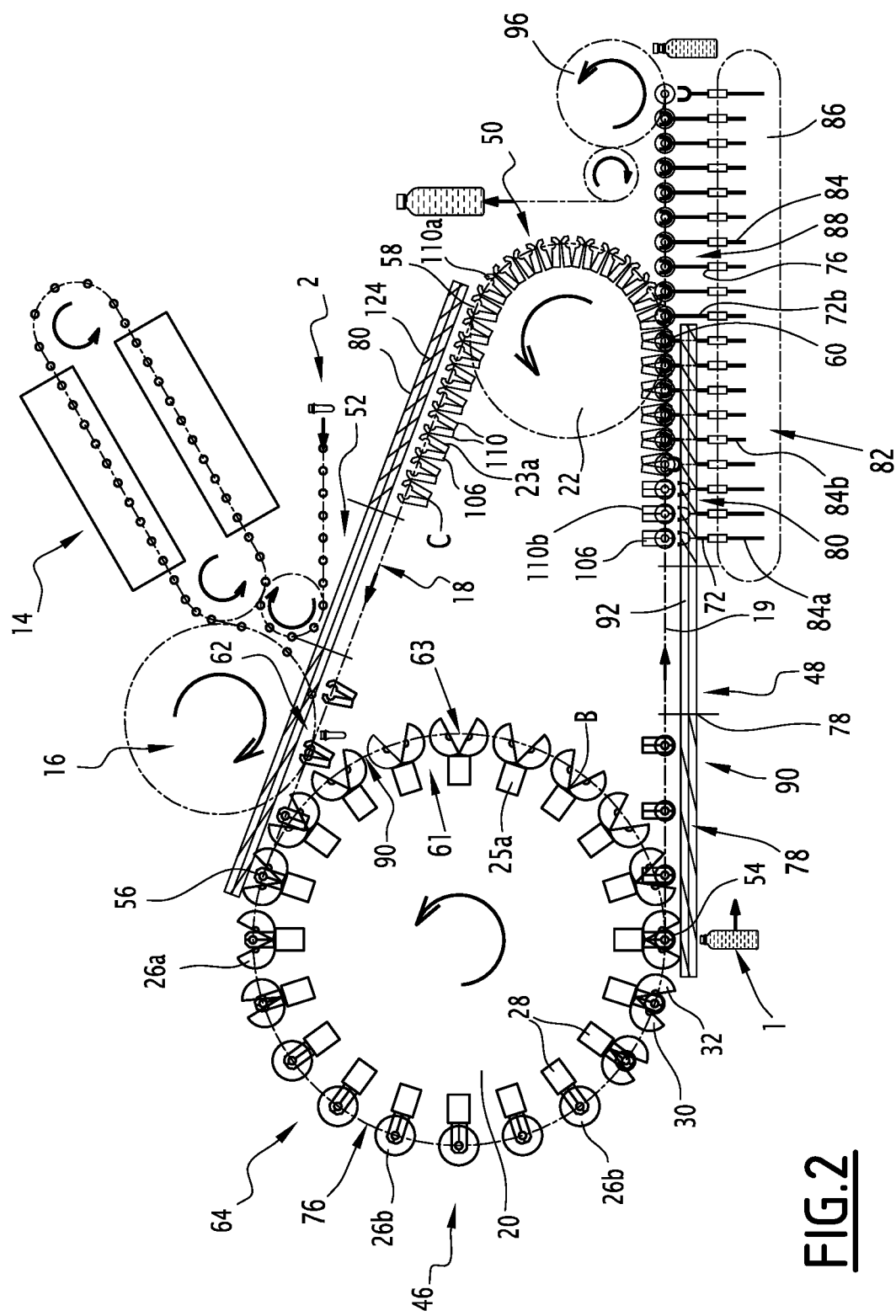
FIG. 2 is a diagrammatical view from above of a machine
for forming containers according to a second embodiment of
the invention.
Figure 3:
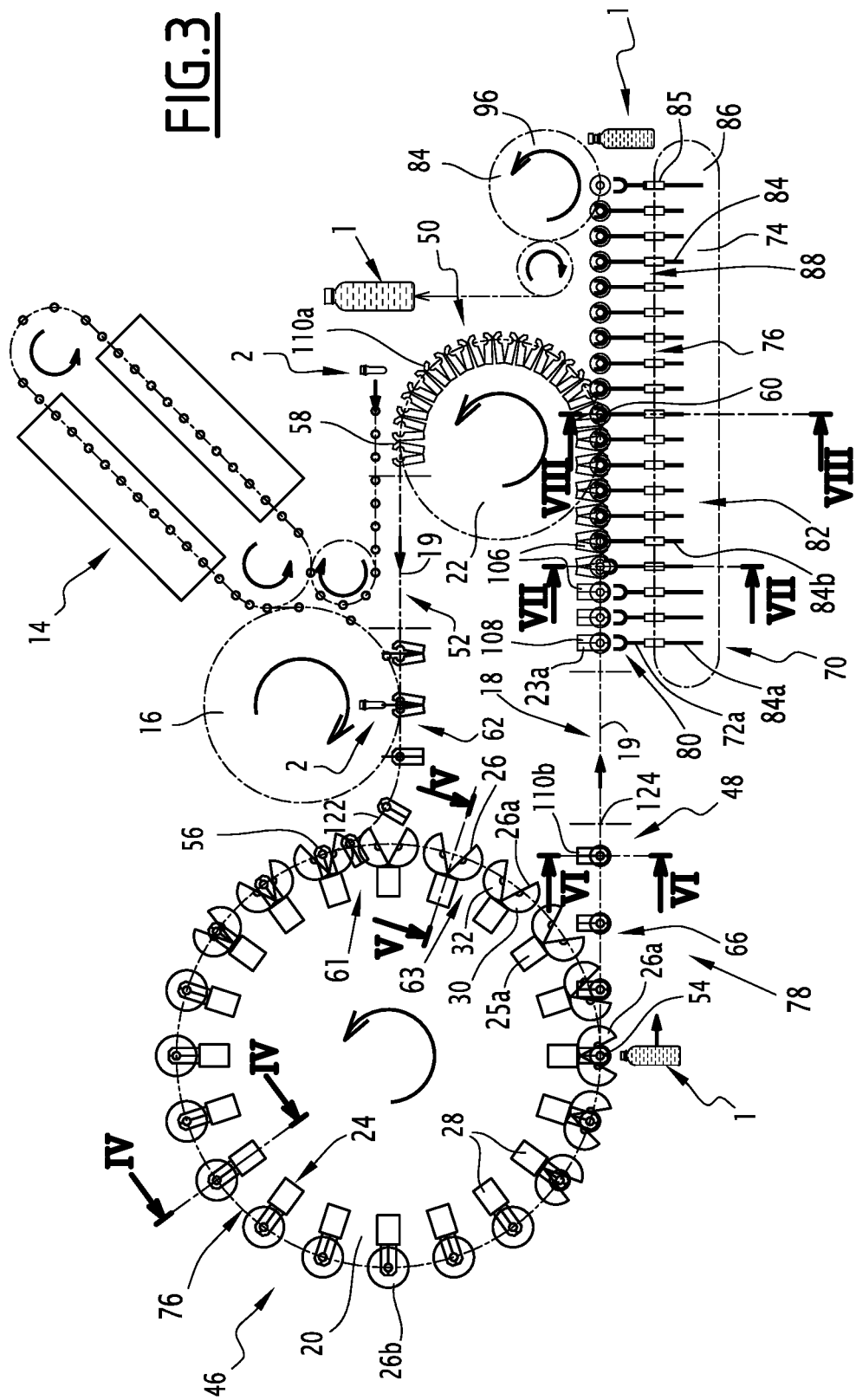
FIG. 3 is a diagrammatical view from above of a machine
for forming containers according to a third embodiment of
the invention.

In reference to FIGS. 1 to 3, there are described two
embodiments of a machine for forming and filling containers
1 from preforms 2 using an incompressible liquid to shape
and fill successive preforms 2 into containers 1. This method
is known as hydro forming and will not be described in great
detail herein.

Figure 4:
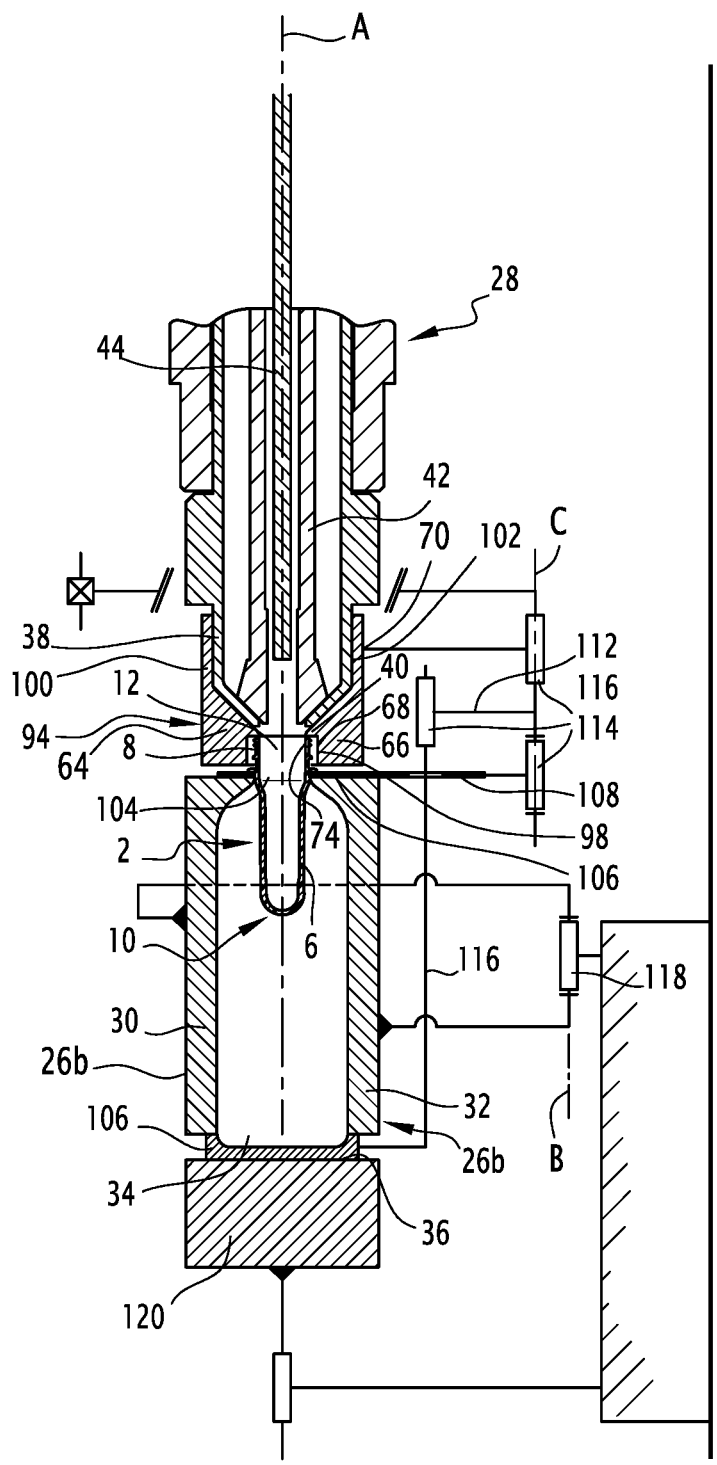
FIGS. 4 to 8 are cross-sectional views of part of the
machine respectively according to lines IV-IV, V-V, VI-VI,
VII-VII and VIII-VIII of FIG. 3, FIGS. 9 and 10 are diagrammatical cross-sectional views
of respectively a main station according to lines V-V of FIG.
3, and an elementary station according to lines VIII-VIII of
FIG. 3 according to a first variant of the third embodiment
of the invention.

Each preform 2, shown in greater detail in FIG. 4, is made
of plastics material, for example of polyesters, such as
polyethylene therephtalate (PET), polyethylene naphtalate
(PEN), polyethylene imine (PEI), polytrimethylene
terephthalate (PTT), polylactic acid (PLA), polyethylene
furanoate (PEF), or polyolefins, such as polyethylene low
density (LDPE) or high density (HDPE), polypropylene
(PP), or styrene based materials such as polystyrene (PS),
acrylonitrile butadiene styrene (ABS) or other polymers,
such as polyvinyl chloride (PVC). Each preform 2 comprises a body 6 in the general shape of a tube of U-shaped
longitudinal section, which is closed at one end and the other
end of which already has the final shape of the neck 8 of the
container 1. In FIG. 4, a preform 2 is shown, by way of non-limiting example, having a cylindrical body 6 extending along a substantially vertical axis A which coincides with the axis of the neck 8. The lower end 10, or bottom 10, of the body 6 is closed and has the general shape of a hemisphere, while the upper end of the preform 2 forms the neck 8, which defines an inner opening 12 and which is, in this case, provided with an outer radial collar adapted to receive a lid or a cap for example by screwing. The bottom 10 of the preform 2 is intended to be shaped to form the bottom 10 of the container 1, while the neck 8 remains the same from the preform 2 to the formed container 1. The preforms 2 are generally produced according to an injection molding process and molded at a site different from the site where the machine for forming containers 1 is located.

Successive preforms 2 are introduced in the machine and undergo a step of heating in an oven 14, or heating station, as shown in FIGS. 1 to 3.

In a conventional manner, the preforms 2 are successively loaded on a carrier, forming a closed loop, circulating within the oven 14. During the passage of the preforms 2 within the oven, the successive preforms 2 are heated up to a temperature compatible with their subsequent deformation into containers. Such an oven 14 and heating step are conventional in methods and machines for producing containers and will not be described in greater detail here.

At the outlet of the oven 14, the preforms are transferred downstream of the machine by a transfer wheel 16 to a first closed loop 18 defined by the machine.

The first closed loop 18 is formed by a conveyor 19, such as a chain comprising a plurality of links attached to each other to form an endless belt, adapted to carry the preforms 2 and to move them, or convey them, in a conveying direction according to a path forming the first closed loop 18 along which the preforms 2 are shaped into containers 1 as will now be described.

The conveyor 19 is moved along the path by a first wheel 20 and a second wheel 22 meshing with the chain on part of their periphery. The first wheel 20 and the second wheel 22, as well as the other various wheels, such as the transfer wheel 16 and the wheels moving the conveyor of the oven 14 are each movable in rotation according to an axis parallel to axis A of the preforms 2 when said preforms 2 are place in the machine. The axis of rotation of the wheels is furthermore substantially perpendicular to the plane(s) in which the first closed loop 18 extends.

The machine is arranged to form the preforms 2 into containers 1 in forming stations 24 formed by the coupling of elementary stations 23 and of main stations 25, as will be described subsequently.

Each forming station 24 comprises a mold 26, injection means 28 and various actuation means (not shown) arranged to move and control the mold 26 and the injection means 28. The mold 26 and the injection means have been represented schematically in FIGS. 1 to 3, but a more detailed embodiment of a mold 26 and of the injection means 28 are shown in FIG. 4.

Each mold 26 comprises at least two side molding parts 30 and 32, movable relative to each other between an opened position as shown by reference 26a in the figures and a closed position as shown by reference 26b in the figures. A hinge extending along an axis B is for example provided between the two parts 30 and 32 to move said parts in rotation around axis B relative to each other between the opened and the closed positions.

In the opened position, the two parts of the mold 30 and 32 are spaced from each other such that a preform 2 can be introduced between the two parts 30 and 32 and such that a formed container 1 can be retrieved form the mold 26, as will be described subsequently.

In the closed position, the two side molding parts of the mold 30 and 32 cooperate with each other in order to form a molding cavity 34 (FIG. 4) having the shape of the container 1 to be formed. According to the first embodiment, in the closed position, the two parts 30 and 32 of the mold 26 further form together a receiving surface forming a neck seat able to hold a preform 2 by its neck 8.

According to the embodiment shown in FIG. 4, the molding cavity 34 is defined by the two side molding parts 30 and 32 in the closed position, and by a bottom molding part 36. The two side molding parts 30 and 32 are movable to be spaced from each other in the opened position. This embodiment of the mold and a variant will be described in more detail subsequently in reference to the second embodiment of the machine according to the invention.

The actuation means of a forming station 24 are arranged to move the mold 26 of the forming station 24 between the opened and closed position at particular places of the first closed loop 18.

The injection means 28 are conventional for a hydro forming process and comprise an injection nozzle 38 placed in fluidic communication with a liquid source (not shown). The injection nozzle 38 is movable between a retracted position (FIG. 5) and an active position (FIG. 4). The injection nozzle 38 comprises an outlet 40 through which the liquid from the liquid source is able to flow and the injection means comprise a sealing member 42, for example a seal pin or seal rod, movable to close and open the outlet. The injection means can further comprise a stretch rod 44 movable in the seal member 42 to assist in the axial deformation of the preform 2 as known per se. The functioning of such injection means 28 is conventional for a hydro forming process and will not be described in great detail herein.

In the active position, the injection nozzle 38 of a forming station 24 is placed on the neck 8 of the preform 2 placed in the mold 26 of said forming station 24 such that liquid can be injected inside the preform 2 through the outlet 40 when the sealing member 42 is in the opened position. In the retracted position, the injection nozzle 38 is retracted to allow the placement of a preform and the extraction of a container below said injection nozzle 38.

The actuation means of a forming station 34 are arranged to move the injection nozzle 38 between the retracted and active positions, as well as to move the sealing member 40 and the stretch rod 42 at particular places of the first closed loop 18 to perform the steps of forming a container 1 from a preform 2.

The first closed loop 18 comprises, in the upstream-downstream order:
 a first circular portion 46;
 a first straight portion 48;
 a second circular portion 50; and
 a second straight portion 52.

The first circular portion 46 is formed by the part of the conveyor 19 passing around an outer part of the periphery of the first wheel 20. By outer part, it is meant the part of the first wheel 20 which does not face the second wheel 22.

The first straight portion 48 is formed by the part of the conveyor 19 extending between the first circular portion 46 and the second circular portion 50. The first straight portion 48 extends substantially rectilinearly between the first circular portion 48 and the second circular portion 50. By "substantially rectilinearly", it is meant that the radius of curvature of the first straight portion is greater than 5 meters.

According to the embodiments shown in FIGS. 1 to 3, the first straight portion 48 extends in a direction forming a tangent of the first circular portion 46 at a separation junction 54 between the first circular portion 46 and the first straight portion 48, meaning that the first straight portion 48 forms a tangent to the first circular portion 46 at the separation junction 54 between said portions. This embodiment is particularly advantageous as will be described subsequently but, according to other embodiments, the first straight portion 48 can extend in another direction.

The second circular portion 50 is formed by the part of the conveyor 19 passing around an outer part of the periphery of the second wheel 22. By outer part, it is meant the part of the second wheel 22 which does not face the second wheel 20.

The second straight portion 52 is formed by the part of the conveyor 19 extending between the second circular portion 50 and the first circular portion 46. The second straight portion 52 is joined to the first circular portion 46 at a junction 56. The junction 58 between the second straight portion 52 and the second circular portion 50 is diametrically opposed to an exit junction 60 located between the first straight portion 48 and the second circular portion 50, with respect to the second wheel 22, as shown by dotted line of FIG. 1.

According to the invention, the elementary stations 23 are arranged to move along the first closed loop described above, while the main stations 25 are arranged to move along a second closed loop 61.

The second closed loop 61 is defined by the periphery of the first wheel 20, meaning that the second closed loop 61 has a circular shape defined by the circle formed by the periphery of the first wheel 20. This also means that the main stations 25 are carried by the first wheel 20. Consequently, the first closed loop 18 and the second closed loop 61 have the first circular portion 46 in common, meaning that the first circular portion 46 is part of the first closed loop 18 as well as part of the second closed loop 61. In addition the first circular portion 46, the second closed loop 61 is defined by the inner part 63 of the periphery of the first wheel 20. By inner part, it is meant the part of the first wheel 20 facing the second wheel 22. The inner part 63 forms a distinct part of the second closed loop 61, while the first straight portion 48, the second circulate portion 50 and the second straight portion 52 form a distinct part of the first closed loop 18. By distinct part, it is meant a part of the loop that belongs only to said loop and not to the other loop. This means that the distinct part of the first closed loop 18 extends outside the periphery of the first wheel 20 and is not formed by the periphery of said wheel 20. In other words, the elementary stations 23 are detached from the first wheel 20 when said elementary stations 23 circulate in the distinct part of the first closed loop 18.

A first embodiment of the machine will now be described in reference to FIG. 1.

According to the first embodiment, the elementary stations 23 are each formed by one mold 26 and its actuation means, while the main stations 25 are each formed by the injection means 28, as described above, as well as cooling means when needed. In the first embodiment, what is meant by mold 26 is the two side molding parts 30 and 32, without the bottom forming part 36, meaning that, in the first embodiment, the two side molding parts 30 and 32 move along the first closed loop 18, while the bottom forming part 36 moves along the second closed loop 61 with the injection means 28.

The molds 26 and their actuation means forming the elementary stations 23 are carried by the conveyor 19 moving along the first closed loop 18. The actuation means carried with the molds 26 include the means for moving the molds between their opened and closed positions and the means for locking the molds in the closed position.

The machine comprises a loading area 62, wherein the successive preforms 2 are loaded into successive molds 26 forming the elementary stations 23, meaning that in the loading area 62, each preform 2 is transferred from the transfer wheel 16 to a mold 26. Consequently, the actuation means of the mold 26 are arranged such that the mold 26 is in the opened position when the mold 26 is in the loading area 62. According to the embodiment shown in FIG. 1, the loading area 62 of the machine is formed in the second straight portion 52 of the first closed loop 18, just before the molds 26 reach the first circular portion 46 of the first closed loop 18. However, it is to be understood that the loading area 62 could be placed more upstream, for example in the second circular portion 50 of the first closed loop.

Once, a preform 2 has been loaded in the mold 26 located in the loading area 62, the actuation means of the mold 26 are arranged to move the mold 26 in the closed position, such that the preform 2 extends in the molding cavity 34 defined by the mold 26. So, in that first embodiment, the mold 26 acts as holding means 26, holding the neck of the preform and the neck of the filled container. It also holds the whole formed container, including the vicinity of the bottom of the container.

When the preform 2 extends in the molding cavity 34, the preform 2 is held by its neck 8 by the mold 26, said neck 8 extending outside the molding cavity 34 and closing said molding cavity 34 in a fluid tight manner, as shown in FIG. 4. Once the mold 26 is placed in the closed position, said position is locked for example by appropriate locking means arranged to prevent the mold 26 from moving to the opened position.

The machine further comprises means for placing an extension device 64 on the neck 8 of each preform 2. An example of an extension device 64 is shown in FIGS. 4 and 6 to 8.

The extension device is arranged to increases the height of the neck 8 of the container, thereby offering an extra space for the liquid contained in the formed containers, which reduces the risks of spilling the content of the containers when the containers are moved with the molds 26 on the first straight portion 48 after the molds have been separated from the main stations 25 and the injection nozzles 38 are no longer closing the containers 1, as will be described subsequently.

Each extension device 64 comprises a connection part 66 adapted to be attached to the neck 8 of a preform. To that end, the connection part 66 comprises a central bore defined by a wall 68 having a shape arranged to enclose the outer face of the neck 8. Consequently, the diameter of the central bore is greater to the diameter of the neck 8. According to a particular embodiment, the wall 68 can have a shape substantially complementary to the shape of the outer face of the neck and a diameter substantially equal to the diameter of the neck 8. Advantageously, the extension device 94 may be able to protect the neck 8 against deformation during the injection of the forming liquid at high pressure and during the filling of the container. When the extension device 64 is attached to or placed on the neck 8, the central bore of the connection part 66 and the inner opening 12 of the neck 8 are substantially coaxial and extend along axis A.

The extension device 64 further comprises an extension part 70 extending in the continuity of the connection part 66 and comprising a central bore, defined by a wall 72, coaxial with the central bore of the connection part 66. According to the embodiment shown in FIGS. 4 and 6 to 8, the diameter of the central bore of the extension part 70 is greater than the diameter of the central bore of the connection part 66 in order to receive the injection nozzle 38, as will be described later. The inner face of the wall 72, surrounding the central bore, is for example substantially smooth and can be tapered such that the central bore of the extension part 70 has a conical shape in the vicinity of the connection part 66. When the extension device 64 is attached to or placed on the preform 2, the extension part 70 extends over the connection part 66 substantially in the continuity of the neck 8 in order to extend the length of the neck 8. The length of the extension part 70 along the axis of its central bore, i.e. according to axis A when the extension device 64 is attached to or placed on the preform 2, is larger than the diameter of the inner opening 12 of the neck 8, and is for example comprised between 2 times and 10 times the diameter of the inner cylindrical opening 12 of the neck 8. The length of the extension part 70 is for example comprised between 10 and 100 mm, while the neck of the preform 2 is typically comprised between 5 and 15 mm. The length of the extension device 64 is chosen relative to the different speeds of the machine. The greater the speeds of the machine are, the longer the extension device 64 has to be.

When the extension device 64 is attached to or placed on the neck 8 of the preform 2, the inner opening 12 of the neck 8 remains accessible via the central bores of the extension part 70 and of the connection part 66 of the extension device 64.

A shoulder 74 extends radially in the central bore of the extension device 64 between the connection part 66 and the extension part 70. The inner diameter of the shoulder 74 is arranged such that, when the connection part 66 is attached to or placed on the neck 8, the shoulder 74 rests on the upper end of the neck 8 and forms an abutment stopping the extension device 64, thereby preventing the extension part 70 of the extension device 64 of reaching the neck 8. Furthermore, the shoulder 74 forms a seal between the inner volume of the extension part 70 and the space between the outer face of the neck 8 and the wall 68 of the connection part 66, thereby preventing any liquid from flowing in this space, when the liquid is in the inner volume of the extension part 70, which means that the extension device 64 is placed on the preform 2 in a fluid tight manner.

The extension device 64 is for example made of plastics material and the inner wall 72 of the extension part 70 can for example be coated with a hydrophobic material or can be made of an hydrophobic material in order to ensure that any liquid present in the central bore of the extension part 70 will flow from said central bore towards the inner opening 12 of the neck 8.

The extension devices 64 are attached to or placed on successive preforms 2 upstream of the loading area 62 of the first closed loop 18 such that the preforms are placed in the molds 26 with an extension device already attached to them. Alternatively, the extension devices 64 could be attached to or placed on the preforms downstream of the loading area 62 when the preforms are already held in molds 26. The extension devices 64 can be attached to or placed on the successive preforms upstream or downstream of the oven 14. When the extension devices 64 are attached to or placed on the preforms upstream of the oven 14, the extension devices 64 protects the neck 8 of the preforms 2 during the heating step. When the extension devices 64 are attached to or placed on the preforms downstream of the oven 14, the extension devices 64 are maintained at a constant temperature, which prolongs their duration in time.

According to a particular embodiment, the extension devices 64 are each attached to a mold 26 and are movable relative to said mold 26 along axis A such that the extension device is spaced from the mold 26 when said mold is in the opened position, so that a preform can be inserted in the mold, and such that the extension device is placed on the neck of the preform 2 when the mold 26 is closed. Such an embodiment is particularly advantageous in that the extension device 64 can be guided on the preform 2 relative to the mold 26 to properly align the axis of the central bore of the extension device 64 with the axis A of the preform 2.

Once the extension device 64 has been placed on a preform 2 being placed in a mold 26, the mold 26 then moves downstream of the loading area 62 to the junction 56 between the second straight portion 52 and the first circular portion 46. At said junction 56, each mold 26 is coupled with a main station 25, i.e. with injection means 28, to form a forming station 24. When the mold 26 is coupled to injection means 28, the holding means of the preform, formed by the whole mold 26, is therefore integrated in the forming station 24.

The movement of the wheels 20 and 22 is arranged such that, when a mold 26 enters the first circular portion 46, it cooperates with a main station 25, i.e. with injection means 28, in order to form a forming station 24 able to perform the steps of forming and filling a container 1 from a preform 2. Consequently, appropriate connection means are provided on the main stations 25, said connection means being able to receive a mold 26 and to place said mold 26 in proper register with the injection means 28. The connection means are further adapted to separate the mold from the main station 25 at the end of the first circular portion 46 such that the mold 26 can move along the first straight portion 48 while the main station 25 remains on the first wheel 20 and move along the inner part 63 of the periphery of the wheel 20, i.e. along the distinct part of the second closed loop 61, to return to the beginning of the first circular portion 48.

According to the embodiment shown in FIG. 1, the mold 26 is then closed at the beginning of the first circular portion 48, once it has been coupled to a main station 25, but the mold 26 could be closed before the junction 56.

The actuation means of the injection means 28 are arranged to move the injection nozzle 38 of the injection means 28 in the active position once a elementary station 23 has been coupled with a main station 25, meaning that the injection nozzle 38 is placed in fluidic communication with the preform 2 held by the mold 26. It should be noted that the extension device 64 can help in the correct positioning of the injection nozzle 38 relative to the preform 2 since the extension device 64 can receive the injection nozzle 38 as shown in FIG. 4.

The forming station 24 formed by the coupling of the elementary station 23 and the main station 25 is then located at the beginning of a forming area 76 of the machine, wherein the steps for forming the container 1 from the preform 2 are carried out, the forming station then becoming an active forming station. The forming area 76 is formed by the first circular portion 46 of the first closed loop 18, i.e. by the part of the first closed loop 18 in common with the second closed loop 61.

When a forming station 24 circulates in the forming area 76, the steps of shaping the preform 2 into a filled container 1 are successively performed. This means that at the beginning of the forming area 76, the injection nozzle 38 of the injection means 28 is placed in the active position. Then, the sealing member 42 is moved to open the outlet 40 to place the inner volume of the preform in fluidic communication with the liquid source and to inject the liquid in the preform 2. During these steps, the stretch rod 44 is actuated in order to assist in the axial deformation of the preform 2 as known per se. The injection of liquid into the preform 2 causes said preform 2 to expand and to adopt the shape of the molding cavity 34 as known per se. Consequently, at the end of the forming area 76, a formed and filled container 1 is located inside the mold 26. Once the forming and filling of the container 1 is completed, the seal member 42 is placed in the closed position to stop the injection of liquid. At this stage, the forming station 24 having the mold 26 containing the formed and filled container 1 is located at the end of the first circular portion 46, for example in the vicinity of the junction 54 between the first circular portion 46 and the first straight portion 48. By in the vicinity of, it is meant that the forming station 24 is located slightly upstream of the junction 54.

At the end of the forming area 64, the filled and formed container 1 is completely held by the mold 26, and more particularly by its neck 8 and by its bottom 10, which allows moving the filled container 1 at high speed without risking a deformation or a breakage of the container 1.

At the separation junction 54 between the first circular portion 46 and the first straight portion 48, the molds 26 are decoupled from the main stations 25 and are moved along the first straight portion 48 while the main stations 25 return towards the junction 56 between the second straight portion 52 and the first circular portion 46 as described previously. This means that the first straight portion 48 extends downstream of the forming area 76.

Prior to reaching the separation junction 54 between the first circular portion 46 and the first straight portion 48, the injection nozzle 38 has to be placed in the retracted position in order to allow the mold to be decoupled from the main station 25 at said junction 54. This means that when the mold 26 reaches the junction 54 and moves to the first straight portion 48, the container 1 is not closed by the injection nozzle 38 although a centrifugal force is applied on the liquid in the container. The extension device 64, by extending the length of the neck 8, prevents the liquid from being spilled outside the container 1 when said container 1 is not closed.

More particularly, when the containers 1 are moved in rotation at high speed, the centrifugal force tends to displace the liquid outside the container 1. Thanks to the extension device 64, the liquid in maintained in the extension part 70 of the extension device 64. Therefore, the liquid is not spilled outside the container 1 even when said container is subjected to high speeds and important centrifugal forces. Consequently, the rotation speeds and transfer speeds of the machine can be increased for improving the throughput of the machine.

According to the embodiment shown in FIG. 1, since the first straight portion 48 is tangential to the first circular portion 46, the transition between these portions 46 and 48 limits the acceleration imparted on the formed and filled containers 1 contained in the molds 26 and stops the centrifugal force imparted on the containers 1, thereby limiting the constraints applied on the containers 1 and limiting the risks of spilling or of breakage of the containers 1.

The part of the first straight portion 48 adjacent to the first circular portion 46 forms a stabilization area 78, during which the liquid inside the container 1 is allowed to settle inside the container 1 after the rapid movement of rotation to which said liquid was subjected during the circulation of the forming station 24 in the first circular portion 48. When the mold 26 moves along the stabilization area 78 and holds a formed and filled container 1, the liquid inside the extension part 70 of the extension device 64 has time to return inside the container 1 since the liquid is no longer subjected to a centrifugal force on the first straight portion 48. The particular conical shape of the inner wall 72 of the extension part 70 guaranties that the liquid will flow inside the container 1 and will not remain trapped in the extension device 64. A coating of hydrophobic material can also help to guaranty the return of the liquid inside the container 1.

It should be noted that the extension device 64 described above is only an example of means for preventing liquid from overflowing out of a formed container 1 that can be implemented to overcome the problem of the liquid subjected to a centrifugal force. Such means could also be formed for example by means for temporally closing the inner volume of the container 1 once said volume has been filled by liquid and before a final cap is fitted on the container. For example, the elementary station may be provided with an anti-spilling device comprising a temporary blocking plate that is introduced between the neck end and the injection means 28, and blocks the liquid inside the filled container before the withdrawal of the injection means 28. That blocking plate is intended to be withdrawn when the liquid is stabilized inside the container 1, and at least before the cap fitting.

The length of the stabilization area 78 is arranged so that, at the end of said stabilization area 78, the liquid filling the container 1 is completely settled inside the container 1 such that the moving of the filled container 1 at high speed downstream of the stabilization area 78 does not impart a force on the liquid sufficient for the liquid to be spilled over the extension device 64.

At the end of the stabilization area 78, the mold 26 enters a retrieving area 80, wherein the container 1 is retrieved from its mold 26.

In the retrieving area 80, the actuation means of the mold 26 are arranged to move the mold 26 in the opened position such that the container 1 can be retrieved from the mold 26. The opening of the mold 26 is synchronized with retrieving means 82 arranged to seize the container 1 and hold it until the mold 26 and the container 1 are separated.

Figure 7:
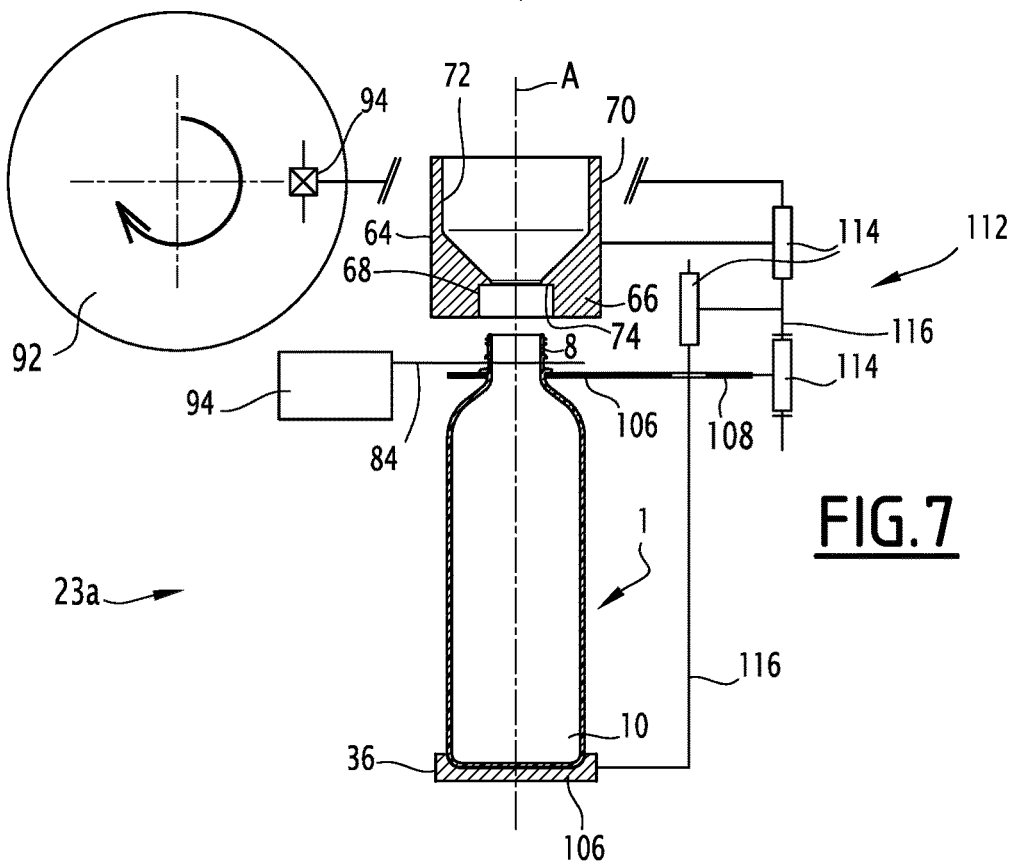
Figure 8:
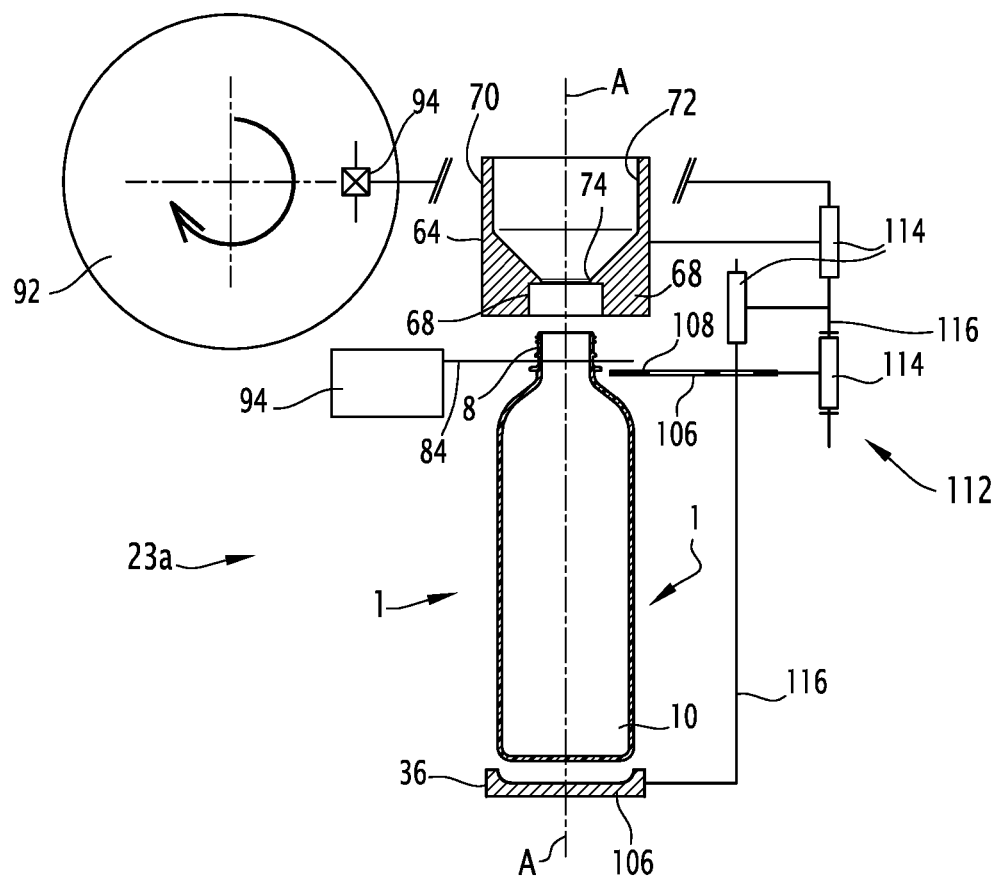

The retrieving means 82 comprise for example a plurality of extraction forks 84, each arranged to hold a container by the shoulder formed under the neck 8 of a container, as more clearly visible in FIGS. 7 and 8. The extraction forks 84 are each carried by an exit carrier 85 driven by an exit conveyor 86 parallel to the first straight portion 48 and the retrieving means 82 comprise suitable actuation means arranged to move each extraction fork 84 from a retracted position (reference 84a in FIGS. 1 to 3), wherein the extraction fork extends away from the straight portion, and an active position (reference 84b in FIGS. 1 to 3), wherein the extraction fork 84 extends in the first straight portion 48 in order to seize a container 1 by its neck. As mentioned previously, the retrieving means 82 are synchronized with the actuation means of the molds such that when a mold 26 is moved to its opened position, an extraction fork 84 is placed in its active position and seize the container 1 placed inside said mold 26 such that when the container is no longer retrained by the mold said container is held by the extraction fork 84, thereby ensuring that a container is always held in the machine, even when the container 1 is separated from the mold 26.

The extension devices 64 are also retrieved from the formed containers 1 in the retrieving area 80 and are returned to the area where they are attached to the preforms. According to the embodiment wherein the extension devices 64 area attached to the molds 26, the extension device 64 is spaced from the mold 26 when the mold 26 is opened such that the container 1 can be retrieved from the mold 26 and the extension device 64 follows the same path as the mold 26 to the loading area 62, as will now be described.

The mold 26 continues its movement towards the opened position while the container 1 is held by the extraction fork 84 and the mold 26 is moved on the first straight portion 48 until it reaches the junction 60 between the first straight portion 48 and the second circular portion 50.

At the exit junction 60, the mold 26 moves along the second circular portion 50 while the filled and formed container 1 held by the extraction fork 84 exits the first closed loop 18 and travels along an exit area 88, which extends in the continuity of the first straight portion 48 downstream of the junction 60 between the first straight portion 48 and the second circular portion 50. Consequently, the exit junction 60, which extends immediately downstream of the first straight portion 48, forms a separation point where the mold 26 follows the path defined by the first closed loop 18 while the formed and filled container follows a different path defined by the exit area 88. The container 1 is therefore completely extracted from the mold 26 at the end of the retrieving area 82 formed by the downstream end of the first straight portion 48.

Advantageously, the exit area 88 includes a substantially rectilinear portion which is in straight alignment and in continuity with the retrieving area 80. Said retrieving area 80 is included in the first straight portion 48 of the first loop 18. The exit conveyor 86 extends at least all along the retrieving area 80 and the exit area 88.

At the exit junction 60, the opened position of the mold 26, the orientation of the mold 26 and the exit area 88 are arranged such that the movement of the formed and filled container 1 on the exit area 88 is not impaired by any part of the mold 26, meaning that the container 1 and the mold 26 can move along different paths without interfering.

The mold 26, still in opened position, moves toward the loading area 62 where a new preform 2 can be loaded inside the mold 26 and the above described forming process can be repeated.

The formed and filled container 1 held by an extraction fork 84 moves in the exit area 88, where a reduction of the pitch between successive containers 1 is performed by reducing means 90. The reducing means 90 for example comprise a worm gear 92 with which a roller 94 provided on an extraction fork 84 is able to mesh, the worm gear 92 being arranged to progressively reduce the distance between successive extraction forks 84 holding containers 1, as shown in the exit area 88 of FIG. 1 and as shown diagrammatically in FIGS. 6 to 8. Alternatively, the reducing means 90 can be formed by successive carriers carrying the extraction forks 84, said carriers being controlled such that the distance between successive carriers is reduced in the exit area 88.

At the end of the exit area 88, the formed and filled containers 1 are picked up by a capping wheel 96, where a cap is applied on each container 1 in a manner known per se. The pitch reduction between the formed and filled containers 1 allows using a capping wheel 96 having a smaller diameter, which does not impart an important centrifugal force on the containers 1. For a better understanding, the dimensions of the capped container 1 obtained at the outlet of the capping wheel 96 have been enhanced relative to the opened containers in FIGS. 1 to 4.

It should be noted that the pitch reduction advantageously occurs while the containers are on a substantially rectilinear path in the exit area 88. Consequently, the deceleration to which the containers are subjected during the pitch reduction is controlled and progressive and does not apply a centrifugal force on the containers 1, which allows a pitch reduction without spilling the liquid in the containers 1 even if the containers 1 are not yet closed by a cap, which would not be the case with a pitch reduction occurring in a wheel.

Downstream of the capping wheel 96, the closed containers are retrieved from the machine as known per se.

In the embodiment disclosed above, since the molds 26 are much less cumbersome than the entire forming stations 24, the second wheel 22 can have a reduced diameter relative to the first wheel 20, thereby reducing the space requirement for the machine. For example, the first wheel 20 has a diameter substantially comprised between 1.2 m and 3 m while the diameter of the second wheel 22 is for example comprised between 1 m and 1.5 m. In such a machine, the first straight portion has an overall length, between the separation junction 54 and the exit junction 60, substantially comprised between 2 m and 4.5 m, with a stabilization area 78 having a length substantially comprised between 1 m and 2 m.

Consequently, the second straight portion 52 is not parallel to the first straight portion and forms an angle, for example substantially comprised between 20° and 45°, with the first straight portion 48. This angle, in addition to reducing the space requirement for the machine, allows increasing the number of active forming stations 24.

In the embodiment described above, for a first wheel carrying twenty main stations 25, nine active forming stations 24 can be formed. It should be noted that by forming an angle between the first straight portion 48 and the second straight portion 52, it is possible to increase the number of active forming stations 24 since in this case, the junction 56 between the second straight portion 52 and the first circular portion 46 is placed "earlier", i.e. more upstream on the first wheel 20, than if the first and second straight portions were parallel to each other, meaning that the forming station can become active more upstream on the first wheel 20.

In the embodiment described above, the first wheel 20 carries the injection means 28 of the forming stations as well as cooling means 120 arranged to support and to cool the bottom molding part 36 (visible in FIGS. 4, 5, 9 and 11). Both of them are connected to fluidic sources and need actuation means. This greatly simplifies the mechanical structure of the machine, since the injection means 28 as well as the support and cooling means 120 are steady parts and are firmly attached to the first wheel 20, even if they are movable with respect to the first wheel 20. The integration of the holding means in the forming stations 24 remains quite simple since the holding means are formed by the two side molding parts 30, 32, which simply have to be placed between the injection means 28 and the bottom molding part 36 and its cooling means 120 to form the forming stations 24.

However, in the embodiment disclosed above, the entire molds, which are relatively heavy components, need to be carried by the conveyor 19, which therefore has to be robust and which can cause mechanical problems when constructing the machine.

A second embodiment, wherein the machine is subjected to less mechanical constraints, will now be described in reference to FIGS. 2 and 3.

In the second embodiment of the machine, the main stations 25a are formed by the injection means 28 and by a main part of the molding cavity 34, while the elementary stations 23a are formed by holding means 106 forming a complementary part of the molding cavity 34. In other words, instead of being formed by the entire mold 26 as in the first embodiment, each elementary station 23a is formed by a much smaller part of said mold 26, while the major part of the mold 26 remains attached to the injection means 28.

Figure 6:
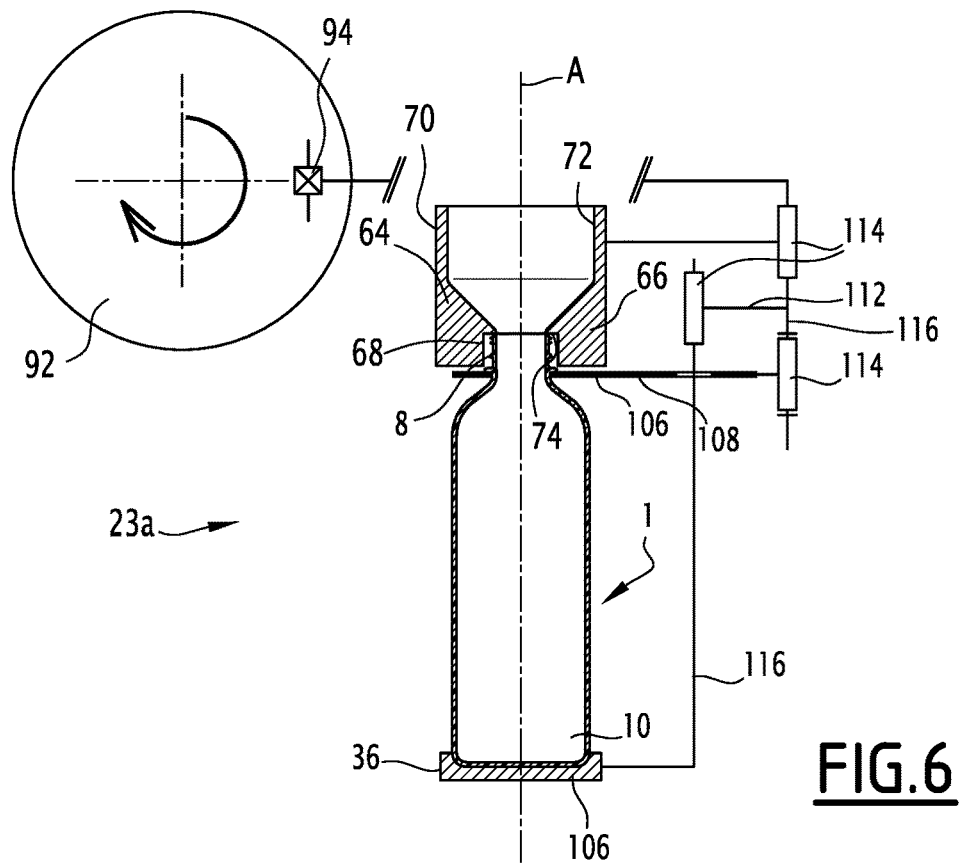

Each elementary station 23a comprises holding means 106 arranged to hold the formed containers 1 in the vicinity of their neck 8 and in the vicinity of their bottom 10, as shown in FIGS. 6 and 7. The holding means 106 for example comprise a neck holding fork 108 and the bottom part 36 of the mold 26, described previously.

Each neck holding fork 108 is arranged to hold the neck 8 for example by encircling the part of the container 1 underneath the neck 8 such that the neck 8 can rest on the neck holding fork 108. Consequently, the neck holding fork 108 is also adapted to carry a preform 2 by its neck 8, as shown in FIG. 4. Each neck holding fork 108 is for example formed by two branches 110 movable relative to each other between an opened position (reference 110a in FIGS. 2 and 3), wherein the branches 110 are spaced from each other such that a preform 2 can be inserted between the branches 110 and a container 1 can be retrieved from the neck holding fork 108, and a closed position (reference 110b in FIGS. 2 and 3), wherein the branches 110 are moved close from each other such as to encircle the preform 2 or the container 1 underneath its neck 8.

The bottom part 36 forms a holding surface having the shape of the container 1 to be formed and furthermore arranged to support the formed and filled container 1 while the bottom 10 of the container 1 rests on the holding surface.

The neck holding fork 108, the bottom part 36 and the neck extension device 94 are movable relative to each other in the vertical direction of axis A such that the distance between the neck holding fork 108 and the bottom part 36, on the one hand, and the distance between the neck holding fork 108 and the neck extension device 64, on the other hand, can be adjusted. The movements of the neck holding fork 108, of the bottom part 36 and of the neck extension device 64 are controlled by actuation means 112. Such actuation means 112 comprise actuators 114 needed to move the bottom part 36, the neck holding fork 108 and the neck extension device 64 relative to each other and connecting rods 116 extending along axis A, connecting the bottom part 36 to the neck holding fork 108 and the neck holding fork 108 to the neck extension device 64.

Figure 5:
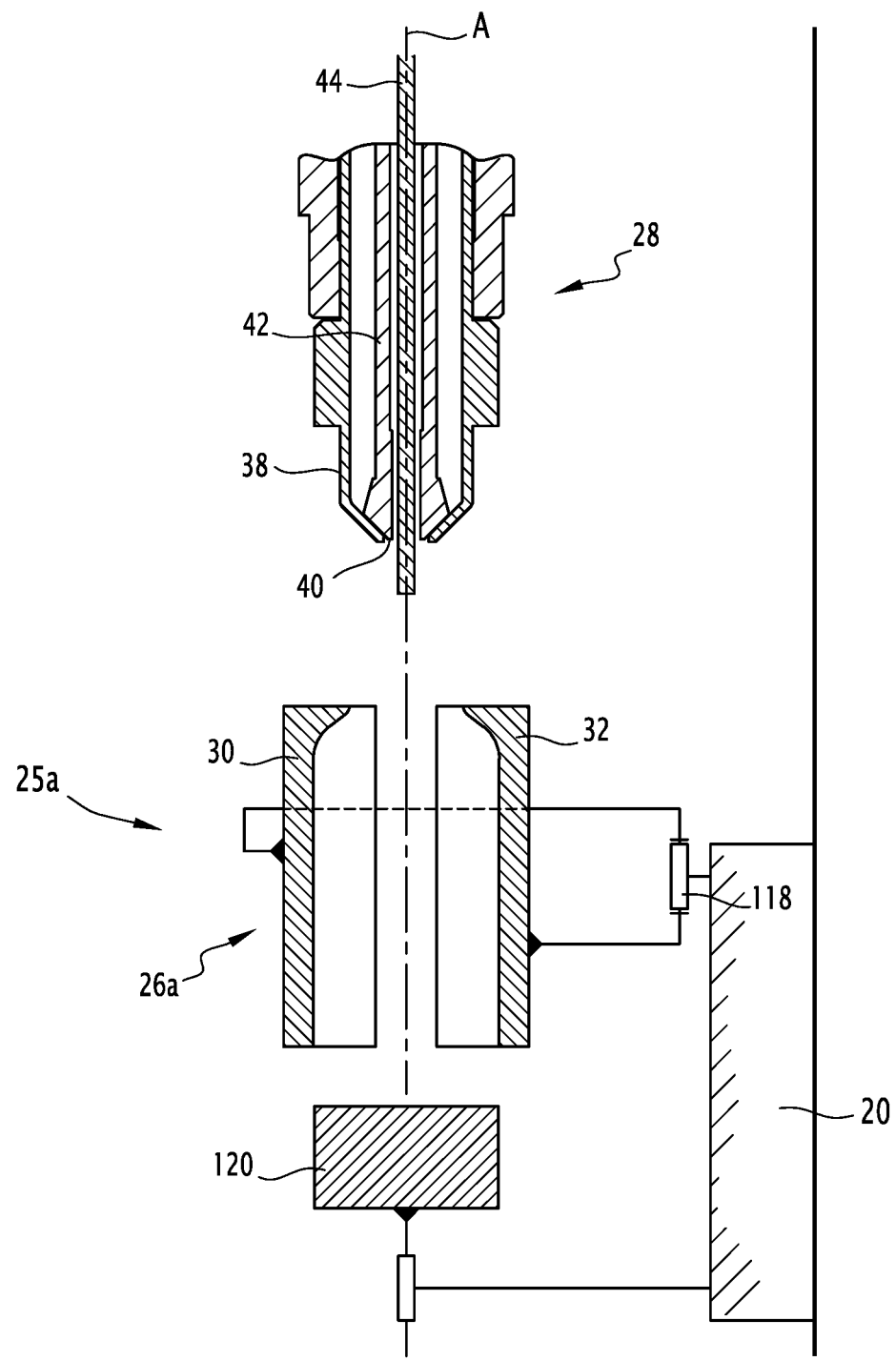

As illustrated in FIG. 5, the main station 25a comprises at least the injection means 28, the two side molding parts 30 and 32 of the mold 26 and the actuation means of the injection means 28 and of the mold 26. As mentioned previously, the main stations 25 are all carried by the first wheel 20 the periphery of which defines the second closed loop 61. As in the first embodiment, the second closed loop 61 has therefore a circular shape defined by the circle forming the periphery of the first wheel 20. The distinct part of the first closed loop 18 extends outside the periphery of the first wheel 20 and is not formed by the periphery of said first wheel 20. In other words, the elementary stations 23a are detached from the first wheel 20 when said elementary stations circulate in the distinct part of the first closed loop.

The holding means 106 are furthermore movable relative to the main station 25a between a coupled position (FIG. 4) and a decoupled position (FIGS. 6 to 8). In the coupled position, the bottom part 36 forms the bottom part of the mold 26 while the neck holding fork 108, in the closed position, is positioned at the upper opening of the mold 26 through which the preform extends to be placed in the molding cavity 34. Consequently, in the coupled position, the bottom part 36 is placed under the two side molding parts 30 and 32 and the neck holding fork 108 is placed over the two side molding parts 30 and 32, said two side molding parts 30 and 32 being in the closed position. The bottom part 36, the two side molding parts 30 and 32 and the neck holding fork 108 are in fluid tight contact with each other in order to form the molding cavity 34 as shown in FIG. 4, at least when the injection means 28 press on the neck end and on the side molding parts 30, 32. The holding means 106 are then integrated in the forming stations 24.

In the decoupled position, the two parts 30 and 32 of the mold are placed in the opened position and the holding means 106 and their actuation means 112 are separated from said two parts 30 and 32 of the mold 26.

For the actuation means 112 to be able to move from the coupled position to the decoupled position without interfering with the two parts 30 and 32 of the mold 26, the actuation means 112 are arranged such that the actuators 114 are all arranged above the two parts 30 and 32 of the mold 26. Furthermore, the rod 116 is arranged to be is arranged to be received in a slot (not shown) of the main station 86, said slot extending between the molding cavity 34 and the hinge connecting the two parts 30 and 32, said hinge being shown diagrammatically under reference 118 in FIGS. 4 and 5. With such an arrangement, it is possible for connection rod 116 to move between the two parts 30 and 32 of the mold 26 when said parts 30 and 32 are in the opened position without interfering with the two parts 30 and 32 and it is possible to move the two parts 30 and 32 in the closed position when the connecting rod 116 is received in the corresponding slot, without impairing the tightness of the molding cavity 34.

The support element 120 and its cooling means are movable according to axis A relative to the two parts 30 and 32 of the mold such that it can be spaced from said two parts 30 and 32 in the opened position, as shown in FIG. 5) in order to be able to move the bottom part 36 between the coupled and decoupled positions without interfering with the main station 25.

According to the second embodiment, shown in FIG. 2, the first closed loop 18 has substantially the same shape as in the first embodiment, meaning that the second wheel 22 has a diameter inferior to the first wheel 20 and that the second straight portion 52 extends substantially rectilinearly between the second wheel 22 and the first wheel 20 and forms an angle with the first straight portion 48. According to the second embodiment, the loading area 62 is placed in the second straight portion 52 just before the elementary stations 23a reach the first circular portion 46, as in the first embodiment. However, it is to be understood that the loading area 62 could be placed more upstream, for example in the second circular portion 50 of the first closed loop.

The elementary stations 23a are moved along the first and the second straight portions 48, 52 by cooperating with worm gears 92, said worm gears having a variable pitch. Therefore, the pitch between two adjacent elementary stations 23a decreases progressively along the first straight portion 48, from the separation junction 54 of the first wheel 20 to the exit junction 60 of the second wheel 22. The conveyor 86 catches the formed and filled containers 1 from the holding means 106 and continues through the exit area 88 of the machine toward the capping wheel 96. In the second embodiment, the neck extension device 64 can be retrieved after the speed of the container being already reduced. Once the neck extension device 64 is retrieved from the container there is no more speed variation and the travel of the filled container can be safe without spilling.

According to a third embodiment, shown in FIG. 3, each of the elementary station 23a is attached to an independent magnetic carrier 124, magnetically driven by a magnetic path (not shown for clarity). Such a transportation means allow the magnetic trolley 124 to move along a curve with a controllable and variable speed. This allows pitch reduction before the exit area 86, as in the second embodiment.

According to the third embodiment, shown in FIG. 3, the second wheel 22 still has a diameter inferior to the first wheel 20 but part of the second straight portion 52 is substantially parallel to the first straight portion 48. The parallel part of the second straight portion 52 extends downstream of the junction 58 between the second circular portion 50 and the second straight portion 52. The first closed loop 18 then comprises a joining portion 122 forming part of the second straight portion 52 and joining the parallel part of the second straight portion 52 to the first circular portion 46 and wherein the conveyer 19 is made tangential to the first wheel 20. The joining portion 122 then forms an angle with the first straight portion 48. According to the third embodiment, the coupling between the elementary stations 23a and the main stations 25a therefore occurs "earlier" than in the second embodiment, i.e. more upstream on the first wheel 20. Consequently, according to the third embodiment, the common part between the first closed loop 18 and the second closed loop 61 is larger than in the first variant, which enables to increase the number of active forming stations. According to the third embodiment, the junction 56 between the second straight portion 52 and the first circular portion 46 is considered as being the junction between the joining portion 122 and the first circular portion 46. According to the third embodiment, the loading area 62 is formed in the second straight portion 52 just before the elementary stations 23 reach the joining portion 122. However, it is to be understood that the loading area 62 could be placed more upstream, for example in the second circular portion 50 of the first closed loop. The first closed loop 18 has a concave area, meaning that in the concave area the radius of curvature of the first closed loop 18 is directed towards the outside of the first closed loop 18. This allows increasing the number of the forming station in the forming area 64.

The functioning of the machine is substantially the same in the second and in the third embodiments.

In the loading area 62, after the preforms 2 have been passed through the oven 14, the successive preforms 2 are introduced in the neck holding forks 108, which are in the opened position. The neck holding forks 108 are then placed in the closed position in order to hold the preforms 2 and the extension devices 64 are moved to be placed on the necks 8 of the successive preforms 2.

The holding means 106 then move to the junction 56 between the second straight portion 52 and the first circular portion 46, where the holding means 108 are coupled with the main stations 25, i.e. the holding means 108 are moved between the two side molding parts 30 and 32 of the mold 26 and the mold 26 is moved in the closed position, such that the holding means 106 are integrated in the forming stations 24. The injection means 28 are then actuated to move their injection nozzle 38 in active position. The main station 25a and the elementary station 23a are then in the configuration shown in FIG. 4 and form an active forming station 24.

The forming and filling steps of the containers 1 from the preforms 2 are then performed while the active forming stations 24 are moved along the first circular portion 46. The forming and filling steps have already been described in relation with the first embodiment and will not be described again. As in the first embodiment, the extension device 64 can help in the correct positioning of the injection nozzle 38 relative to the preform 2 since the extension device 64 can receive the injection nozzle 38 as shown in FIG. 4. Furthermore, as described previously, the extension device 64 is able to protect the neck 8 against deformation during the injection of the forming fluid at high pressure and during the filling of the container.

At the end of the first circular portion 46, the injection means are actuated to move the injection nozzle 38 in the retracted position such that the mold 26 can then be moved in the opened position.

At the separation junction 54 between the first circular portion 46 and the first straight portion 48, the holding means 106 are decoupled from the main stations 25 and are moved along the first straight portion 48 while the main stations 25a return towards the junction 56 between the second straight portion 52 and the first circular portion 46 as described previously. The first straight portion 48 therefore extends downstream of the forming area 76. It should be noted that, at the separation junction 54, the orientation of the two side molding parts 30, 32 and of the holding means 106 is arranged such that the movement of the holding means 106 on the first straight portion 48 does not interfere with the movement of the two side molding parts 30 and 32. Consequently, the coupling and decoupling of the holding means 106 to and from the main stations 25a require a particular cinematic, which is more complex than in the first embodiment.

It should be noted that the forming area 76 of the machine according to the second and third embodiments may be reduced relative to the first embodiment, since the upstream part of the first circular portion 46 is used to close the mold 26 and to place the injection nozzle 38 in the active position, while the downstream part of the first circular portion is used to place the injection nozzle 38 is the retracted position and to open the mold 26. For example, for a first wheel 20 carrying twenty main stations 25a, six active forming stations 24 can be formed in the second embodiment. It should be noted that the number of active forming stations 24 can be slightly increased with the third embodiment bringing the number of active forming stations to eight for a first wheel carrying twenty main stations 25a.

Prior to reaching the separation junction 54 between the first circular portion 46 and the first straight portion 48, the injection nozzle 38 has to be placed in the retracted position and the mold 26 has to be opened in order to allow the holding means 106 to be decoupled from the main station 25 at said separation junction 54. This means that when the holding means 106 reach the separation junction 54 and moves to the first straight portion 48, the container 1 is not closed by the injection nozzle 38 although a centrifugal force is applied on the liquid in the container. The extension device 64, by extending the length of the neck 8, prevents the liquid from being spilled outside the container 1 when said container 1 is not closed.

More particularly, when the containers 1 are moved in rotation at high speed, the centrifugal force tends to displace the liquid outside the container 1. Thanks to the extension device 64, the liquid in maintained in the extension part 70 of the extension device 64. Therefore, the liquid is not spilled outside the container 1 even when said container is subjected to high speeds and important centrifugal forces. Consequently, the rotation speeds and transfer speeds of the machine can be increased for improving the throughput of the machine.

When the holding means 106 move along the stabilization area 78 and hold a formed and filled container 1, the liquid inside the extension part 70 of the extension device 64 has time to return inside the container 1 since the liquid is no longer subjected to a centrifugal force on the first straight portion 48. The particular conical shape of the inner wall 72 of the extension part 70 guaranties that the liquid will flow inside the container 1 and will not remain trapped in the extension device 64. A coating of hydrophobic material can also help to guaranty the return of the liquid inside the container 1.

It should be noted that, since the container 1 is held by the bottom part 36 in addition to the neck holding fork 108, there is no risk of deformation of the container 1 while it is moved at high speed in the first straight portion even if the container 1 is not completely held by a mold 26 as in the first embodiment.

The second and the third embodiments differ from the first embodiment in particular in that, since the holding means 106 are far less cumbersome than the forming stations and than the molds 26, the reduction of the pitch between successive containers can occur in the retrieving area 80 instead of occurring in the exit area 88. This can be done by placing the worm gear 92 upstream of the junction 60 between the first straight portion 48 and the second circular area 50 instead of placing it downstream of said junction 60. This pitch reduction in the first closed loop 18 instead of outside the first closed loop 18 makes the machine less cumbersome since the length of the exit area 88 can be reduced, as can be seen by comparing FIG. 1 to FIGS. 2 and 3. However, since the pitch between the successive holding means 106 is performed in the first closed loop 18, the pitch has to be increased again prior to coupling the holding means 106 with the main stations 25. This can be obtained by placing a worm gear 124 parallel to the second straight portion 52, the holding means 106 being arranged to mesh with said worm gear 124 and said worm gear 124 being arranged to increase the distance between successive holding means 106, as shown in FIG. 2.

In the retrieving area 80, the holding means 106 and the extension device 64 are moved to free the container 1 while the extraction fork 84 is moved to its active position to hold the container 1 as shown by FIGS. 6 to 8. The extension device 64 is first moved away from the neck 8 of the container 1, while the extraction fork 84 is placed under the neck 8 of said container 1, as shown in FIG. 7. Then, the distance between the bottom part 36 and the neck holding fork 108 along axis A is increased to free the container 1 while said container is held by the extraction fork 84 as shown in FIG. 8.

The empty holding means 106 are then returned to the loading area 62 via the second circular portion 50, the neck holding fork 108 being maintained in its opened position to be ready to receive a new preform. As mentioned previously, the pitch between the successive holding means 106 is increased again during this step.

The formed and filled containers 1 are moved in the exit area 88 to the capping wheel 96 as in the first embodiment.

According to the second and third embodiments, the separation junction 54 between the first circular portion 46 and the first straight portion 48, which extends immediately downstream of the first circular portion 46, forms the separation point where the mold 26 follows the path defined by the second closed loop 61 while the formed and filled container 1 follows a different path defined by the first straight portion 48. The container 1 is therefore completely extracted from the mold at the beginning of the stabilization area 78 formed by the upstream end of the first straight portion 48.

In the machine according to all the embodiments described above, the formed and filled containers are circulated on a substantially rectilinear portion after having been formed and filled on a circular portion since the first straight portion 48 extends downstream of the forming area 76. This rectilinear portion allows preventing the liquid from being spilled out of the containers even though said containers are not closed by forming a stabilization area wherein the liquid in the containers has time to settle while the containers are being maintained at least by their neck and bottom.

The overall configuration of the first closed loop 18 has been given by way of example only, and other configurations can be implemented. For example, the first and second straight portions 48 and 52 can be arranged to pass one under the other by placing the first and second wheels in different horizontal planes such that the first closed loop has substantially the shape of an "eight". According to other possibilities, more than two circular and/or straight portions can be foreseen in the first closed loop.

As mentioned previously, the machine could be adapted to a simple filling machine, simply by replacing the forming stations with known filling stations and by loading the machine with already formed containers. In this case, the holding means described with the third embodiment are used to move the containers in the machine and the molds are not needed.

Figure 9:
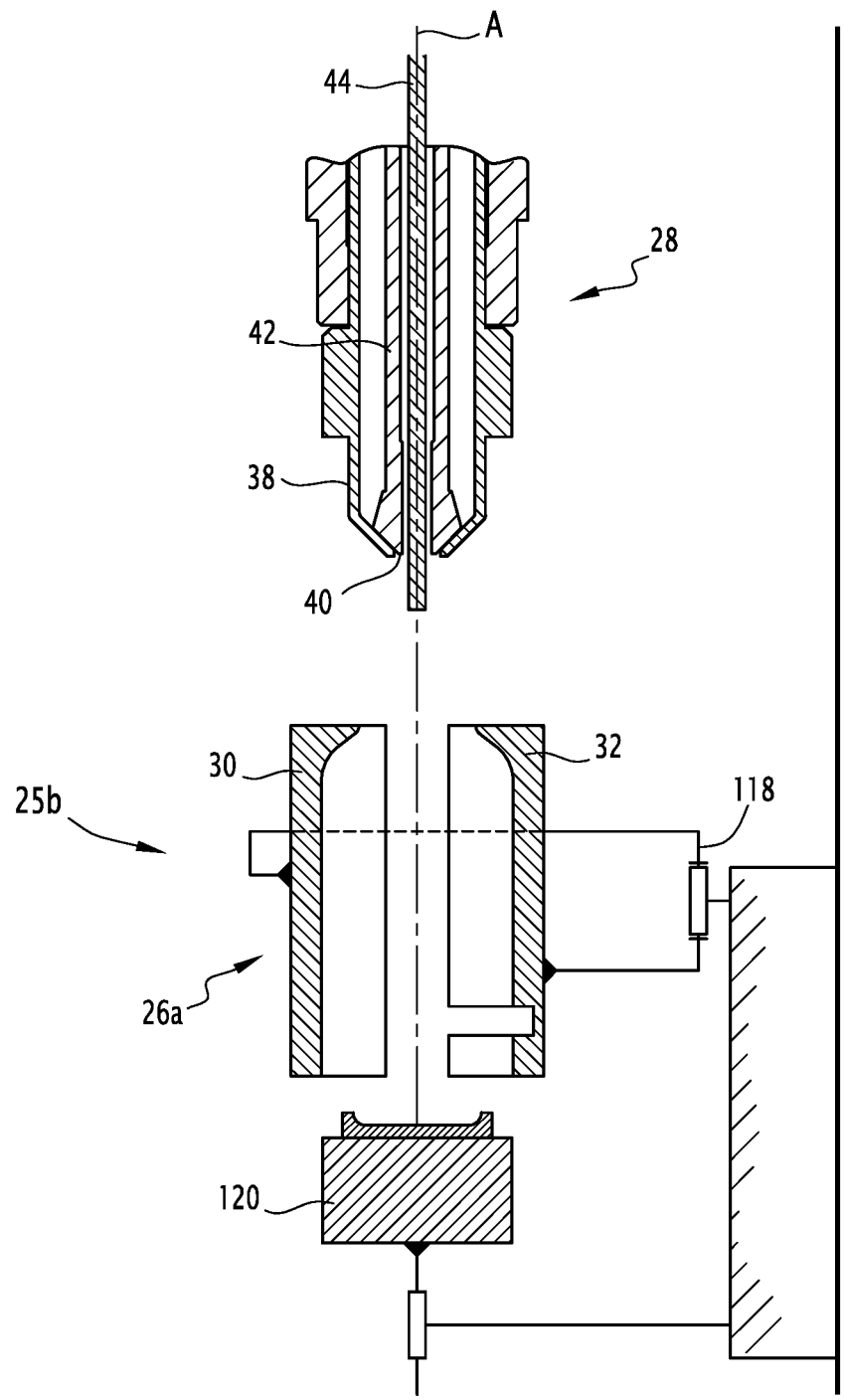
Figure 10:
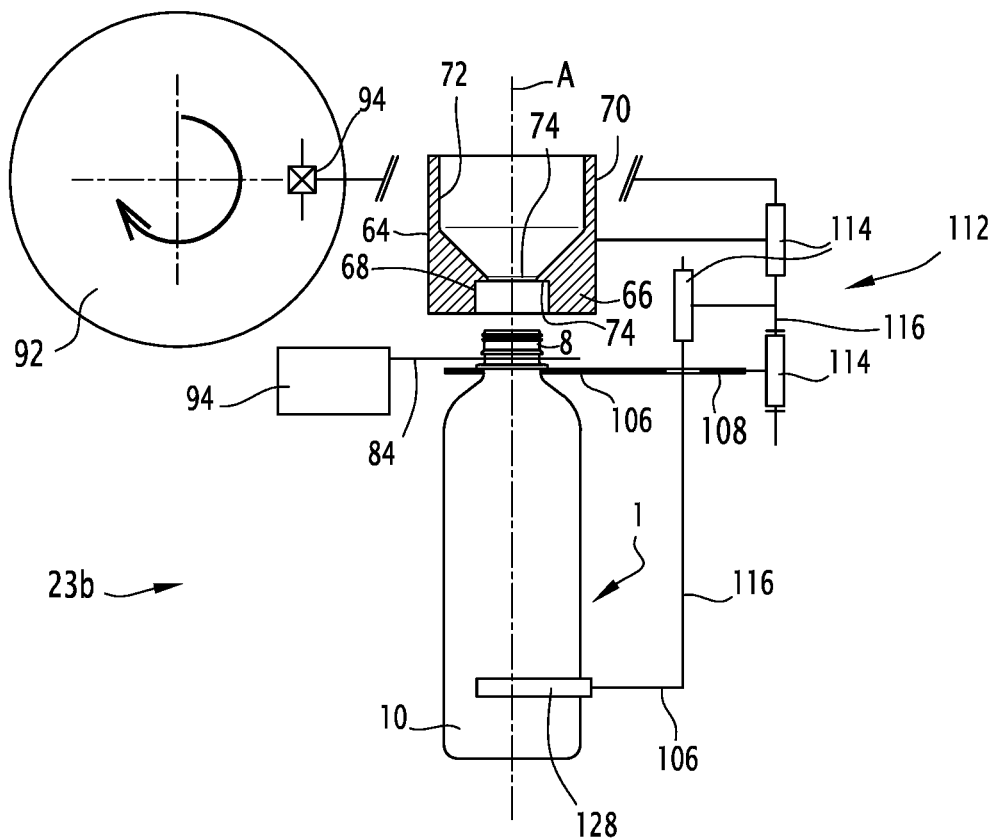

As illustrated in FIGS. 9 and 10, the main stations 25b of a first variant of either the second or the third embodiment contributes to the molding cavity 34, by comprising a main portion 126 of the two side molding parts 30, 32, and by comprising the whole bottom molding part 36 which is permanently attached to the support 120 and the cooling means of the bottom molding part 36. Therefore the cooling means may be very close to the molding surface of said bottom molding part 36. This provides the machine with a very efficient cooling of the bottom of the container. The elementary station 23b of that first variant contributes to the molding cavity 34 by comprising a complementary portion 128 which is located in the vicinity of the bottom of the molding cavity 34. The complementary portion 128 forms together with the main portion 126 the pair of side molding parts 30, 32, when the element station 23b is coupled to the main station 25b. The complementary portion 128 is included in and actuated by the holding means 106 of the elementary station 23b in a way which is similar to the way that the holding means of the second and the third embodiments actuate the bottom holding part 36. The complementary portion 128 is a bottom vicinity holding part 128, meaning that the complementary portion 128 is arranged to hold a formed and filled container in the vicinity of its bottom.

Figure 11:
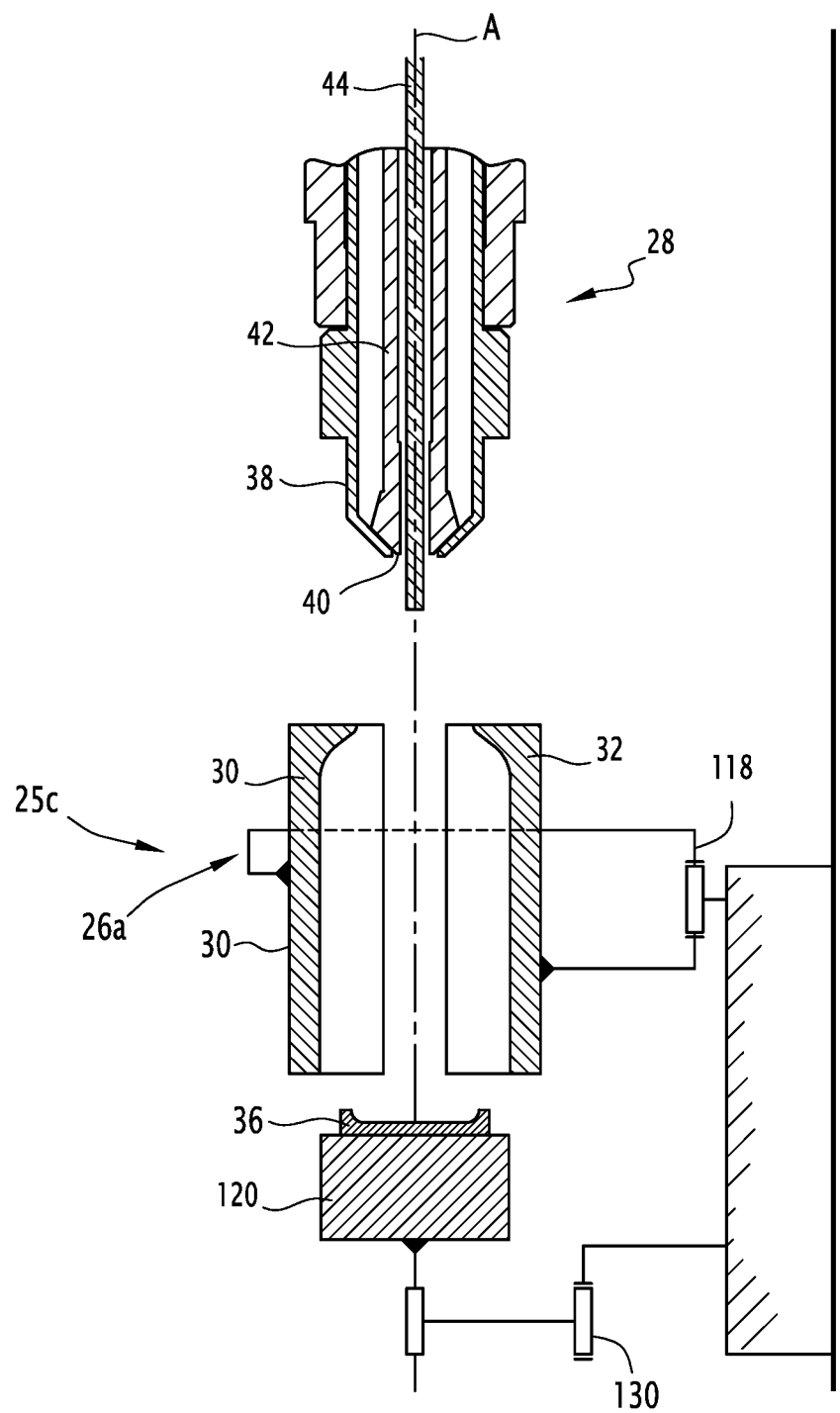
FIGS. 11 and 12 are diagrammatical cross-sectional views
of respectively a main station according to lines V-V of FIG.
3, and an elementary station according to lines VIII-VIII of
FIG. 3 according to a second variant of the third embodiment of the invention.
Figure 12:
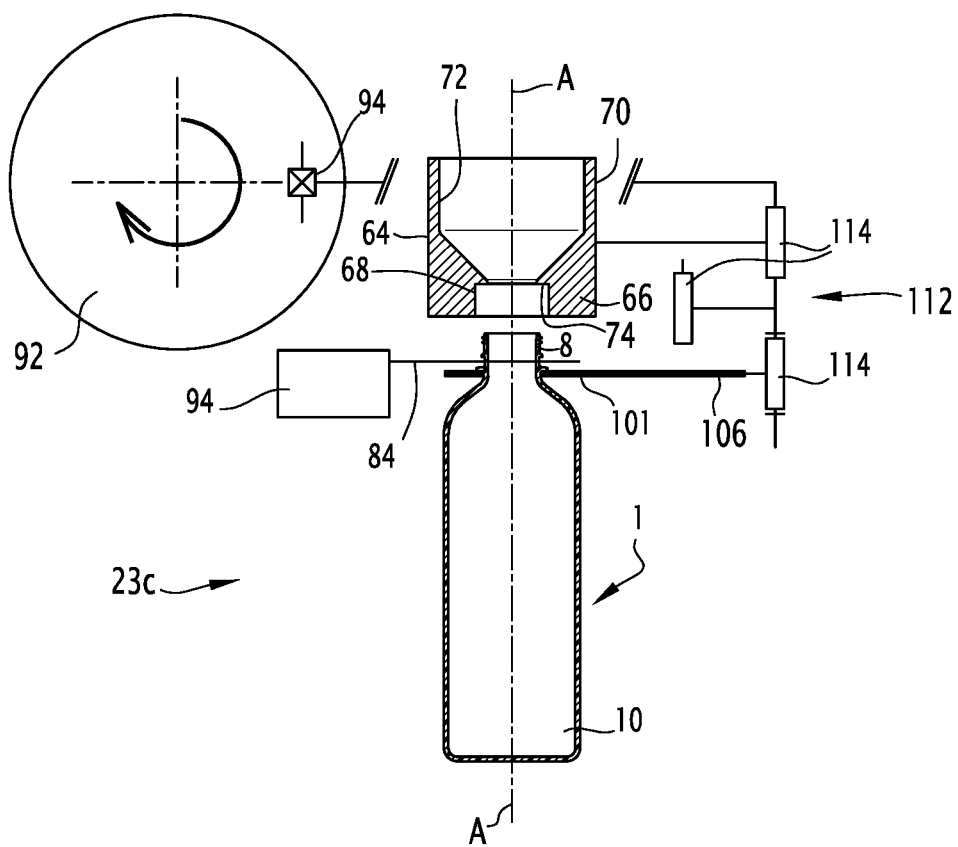

As illustrated in FIGS. 11 and 12, the main stations 25c of a second variant of either the second or the third embodiment contributes to the molding cavity 34, by comprising the entire side molding parts 30, 32, and by comprising the whole bottom molding part 36 which is permanently attached to the support 120 and the cooling means of the bottom molding part 36. Therefore, as in the first variant, the second variant provides the machine with a very efficient cooling of the bottom of the container. The elementary station 23c of that second variant does not contribute at all to the molding cavity 34. The holding means 106 of the second variant only have the neck holding fork 108 and the actuators 114 for moving the extension device, or any anti-splitting device. The way in which the extension device 64 is used in the second variant is exactly the same as in the first, second and third embodiments, as well as in their first variant. The second variant of the second and the third embodiments provide a much simpler way to couple the elementary station 23c with the main station 25c. Additionally, each elementary station 23c is even lighter. This allows the third embodiment for example to have a joining portion 122 much closer to the separation junction 54. Therefore the number of active forming stations 24 is increased.

Additionally, the main station 25c, according to the second variant, includes a transition arm 130 between the first wheel 20 and the bottom support 120 and the cooling mean. That transition arm 130 is arranged to move the bottom support 120 and the bottom molding part 36, not only vertically, like in the other variants, but also laterally. The mold opening sequence for the second variant is the same as what has been described with reference to FIGS. 3 and 4, in a sense that the mold opens during the first circular portion 46, just before the separation junction 54. During the mold opening, said bottom holding means 36 still holds the bottom of the container 1, and this, up to and including the separation junction 54. Then, during a short period of time starting immediately after the separation junction 54, the transition arm 130 moves the bottom holding means with respect to the main station 25c, so as to follow the straight portion 48. That short period of time is mainly used for retrieving the bottom holding means from the container bottom, without interfering with it. Then, the filled container 1 continues its travel along the stabilisation area at the beginning of the first straight portion 48, while the bottom holding means 36 and the support 120 are moved back to its main station 25c.

The invention claimed is:

1. A machine for forming and filling successive containers from a preform with liquid as the forming medium, the machine comprising a plurality of forming stations, each forming station having a main station and an elementary station which are coupled together to form the forming station, wherein the machine includes a series of elementary stations moving along a first closed loop and a series of main stations moving along a second closed loop, the first closed loop and the second closed loop having at least one common part wherein the main stations are coupled with the elementary stations and at least a distinct part wherein the main stations are separated from the elementary stations.

2. The machine for forming and filling containers according to claim 1, wherein fewer of the main stations move along the second closed loop than the elementary stations that move along the first closed loop.

3. The machine for forming and filling containers according to claim 1, further comprising at least a first wheel carrying the series of main stations, the distinct part of the first closed loop extending outside the periphery of the first wheel.

4. A machine for forming and filling containers according to claim 3, wherein the second closed loop is defined by the periphery of the first wheel.

5. The machine for forming and filling containers according to claim 1, wherein each elementary station includes holding means for holding at least a neck of a preform or of a filled container.

6. The machine for forming and filling containers according to claim 5, wherein the holding means comprise at least a neck holding part arranged to hold the container by its neck and at least a bottom holding part arranged to hold the container by its bottom, the neck holding part and the bottom holding part being movable relative to each other between a holding position, wherein a container is held and a release position wherein the bottom holding part and the neck holding part are moved away from each other.

7. The machine for forming and filling containers according to claim 1, wherein each forming station includes a molding cavity defining the shape of the container to be formed, each main station comprising at least a main part of the molding cavity;
wherein the forming station includes a pair of side molding parts, each part of the pair being movable with respect to the other part between an opened configuration, wherein a preform can be inserted in the pair and a filled container is extractable from the pair, and a closed configuration wherein the pair cooperates with a bottom molding part to form the molding cavity; and
wherein each main station further comprises injection means for injecting the liquid inside a preform placed in the molding cavity.

8. The machine for forming and filling containers according to claim 5, wherein the elementary station includes the pair of side molding parts, the holding means being constituted by the pair, and
wherein the main part of the molding cavity included in the main station comprises the bottom molding part.

9. The machine for forming and filling containers according to claim 5, wherein the main part of the molding cavity included in the main station includes the pair of side molding parts and is arranged to receive the holding means.

10. The machine for forming and filling containers according to claim 9, wherein the main station further comprises a transition arm arranged to move at least laterally the bottom molding part.

11. The machine for forming and filling containers according to claim 5, wherein the main part of the molding cavity included in the main station comprises a main portion of the pair of side molding parts, the holding means comprising a complementary portion of the pair of side molding parts, the main portion and the complementary portion forming together the pair of side molding parts.

12. The machine for forming and filling containers according to claim 1, wherein each elementary station further comprises an anti-spilling device configured to prevent liquid from overflowing out of a formed container.

13. The machine for forming and filling containers according to claim 12, wherein the elementary station comprises an anti-spilling actuator arranged to place the anti-spilling device in an anti-spilling configuration and to move the anti-spilling device away from the holding means for retrieving the anti-spilling device from the neck of a preform.

14. A machine for forming and filling containers according to claim 12, wherein the anti-spilling device comprises an extension device arranged to be placed on the neck of a preform or a container in a fluid tight manner, the extension device comprising a central bore extending in the continuity of the inner cylindrical opening of the neck of the preform.

15. The machine for forming and filling containers according to claim 1, wherein the distinct part of the first closed loop comprises at least one straight portion extending downstream of the common part of the first closed loop and second closed loop, the common part of the first closed loop and second closed loop comprising at least one circular portion, the straight portion of the first closed loop extending immediately downstream of the circular portion and extending according to a direction forming a tangent of the circular portion at a separation junction between the circular portion and the straight portion, the main stations being separated from the elementary stations at the separation junction.

16. The machine for forming and filling containers according to claim 15, wherein the machine further comprises an exit area extending outside the first closed loop and connected to the first closed loop at an exit junction located downstream of the straight portion, and still further comprises an exit conveyor provided with exit carriers, and
wherein the exit conveyor extends continuously along a retrieving area located upstream of the exit junction and along exit area, each exit carrier comprising extraction means arranged to extract the filled container from the holding means while the exit carrier is in the retrieving area.

17. The machine for forming and filling containers according to claim 16, further comprising reducing means located upstream the exit junction and arranged to reduce the pitch between successive elementary stations and/or further comprising reducing means located along said exit area and arranged to reduce the pitch between two successive exit carriers.

* * * * *